United States Patent
Lee

(10) Patent No.: US 10,412,797 B2
(45) Date of Patent: Sep. 10, 2019

(54) APPARATUS AND METHODS FOR CONVERTER MODE AND LOAD CONFIGURATION CONTROL

(71) Applicant: Allegro MicroSystems, LLC, Worcester, MA (US)

(72) Inventor: Nai-Chi Lee, Nashua, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 15/722,238

(22) Filed: Oct. 2, 2017

(65) Prior Publication Data

US 2018/0049283 A1    Feb. 15, 2018

Related U.S. Application Data

(63) Continuation-in-part of application No. 15/154,372, filed on May 13, 2016, now Pat. No. 9,781,789.

(51) Int. Cl.
| | | |
|---|---|---|
| H05B 33/08 | (2006.01) | |
| H02M 1/08 | (2006.01) | |
| B60Q 1/14 | (2006.01) | |
| H02M 1/00 | (2006.01) | |

(52) U.S. Cl.
CPC ....... *H05B 33/0815* (2013.01); *B60Q 1/1415* (2013.01); *H02M 1/08* (2013.01); *H05B 33/083* (2013.01); *H05B 33/0845* (2013.01); *H02M 2001/0003* (2013.01)

(58) Field of Classification Search
CPC .............. H05B 33/0815; H05B 41/32; H05B 33/0887; H05B 33/089; H05B 41/28; H05B 41/2825; H05B 41/2985

USPC .................... 315/224, 225, 307, 121, 209 R
See application file for complete search history.

(56) References Cited

U.S. PATENT DOCUMENTS

| | | |
|---|---|---|
| 6,982,527 B2 | 1/2006 | Lee et al. |
| 8,339,049 B2 | 12/2012 | Kang et al. |
| 8,456,105 B2 | 6/2013 | Wang et al. |
| 8,519,630 B2 | 8/2013 | Wang et al. |
| 8,664,930 B2 | 3/2014 | Kang et al. |
| 8,742,682 B1 | 6/2014 | Wang et al. |
| 8,779,805 B1 | 7/2014 | Fernandez et al. |
| 8,901,835 B2 | 12/2014 | Kang et al. |
| 8,928,256 B2 | 1/2015 | Smith |

(Continued)

OTHER PUBLICATIONS

Linear Technology datasheet LT3965 "8-Switch Matrix LED Dimmer" 2016, 24 pages.

(Continued)

*Primary Examiner* — Wei (Victor) Chan
(74) *Attorney, Agent, or Firm* — Daly, Crowley, Mofford & Durkee, LLP

(57) ABSTRACT

A driver coupled to a configurable load includes a first switch coupled between an intermediate node of the load and a converter supply voltage and a second switch coupled between the converter supply voltage and a reference potential. A slew rate control circuit is responsive to a command input signal and to a feedback voltage across the first and second switches and is configured to generate switch control signals with a controllable slew rate for coupling to control terminals of the first and second switches. In an embodiment, the command input signal includes a load configuration command and a converter mode command.

22 Claims, 12 Drawing Sheets

(56) References Cited

U.S. PATENT DOCUMENTS

| | | |
|---|---|---|
| 8,937,433 B1 | 1/2015 | Wang et al. |
| 9,294,084 B1 | 3/2016 | McIntosh et al. |
| 9,425,785 B1 | 8/2016 | Wibben |
| 9,538,601 B1 | 1/2017 | Mangtani et al. |
| 9,621,036 B2 | 4/2017 | Wibben |
| 9,621,041 B2 | 4/2017 | Sun et al. |
| 9,781,789 B1 | 10/2017 | Lee et al. |
| 2004/0075393 A1* | 4/2004 | Ito .................. H05B 33/0815 315/77 |
| 2005/0243022 A1 | 11/2005 | Negru |
| 2010/0026208 A1 | 2/2010 | Shteynberg |
| 2011/0068701 A1 | 3/2011 | van de Ven |
| 2011/0148374 A1* | 6/2011 | Gizara .................. H02M 3/157 323/282 |
| 2011/0215731 A1* | 9/2011 | Jeong .................. H05B 33/0854 315/254 |
| 2012/0104952 A1 | 5/2012 | Chen |
| 2012/0299500 A1 | 11/2012 | Sadwick |
| 2013/0127354 A1 | 5/2013 | Chiang et al. |
| 2013/0257313 A1 | 10/2013 | Battaglia |
| 2013/0341653 A1* | 12/2013 | Yuan .................. H05B 33/0821 257/88 |
| 2015/0163877 A1 | 6/2015 | Bordin |
| 2015/0208469 A1* | 7/2015 | Coetzee .................. H02M 1/36 315/307 |
| 2015/0208476 A1 | 7/2015 | Muramatsu |
| 2016/0049939 A1 | 2/2016 | Martin et al. |
| 2016/0165696 A1* | 6/2016 | Rodriguez ......... H05B 33/0842 315/297 |
| 2016/0200245 A1 | 7/2016 | Rivas et al. |
| 2016/0318439 A1* | 11/2016 | Levasseur ............ B60Q 1/1423 |
| 2017/0201086 A1* | 7/2017 | Chen ........................ H02H 3/08 |

OTHER PUBLICATIONS

Texas Instruments datasheet TPS92661-Q1 "High-Brightness LED Matrix Manager for Automotive Headlight Systems", Sep. 2014, 53 pages.

Office Action dated Jan. 13, 2017 for U.S. Appl. No. 15/154,372; 17 pages.

Response to Office Action dated Apr. 10, 2017 for U.S. Appl. No. 15/154,372; 13 pages.

Notice of Allowance dated Jun. 21, 2017 2017 for U.S. Appl. No. 15/154,372; 13 pages.

* cited by examiner

APPARATUS AND METHODS FOR CONVERTER MODE AND LOAD CONFIGURATION CONTROL

CROSS-REFERENCE TO RELATED APPLICATIONS

This application is a continuation-in-part of U.S. patent application Ser. No. 15/154,372, filed on May 13, 2016, which is incorporated herein by reference in its entirety, for any and all purposes.

STATEMENT REGARDING FEDERALLY SPONSORED RESEARCH

Not applicable.

FIELD OF THE INVENTION

This invention relates generally to drivers and more particularly, to drivers for controlling a converter mode of operation and a load configuration with smooth transitions.

BACKGROUND

DC-DC converters are used in a wide range of applications to provide a regulated output voltage from a battery or other power source. Switch-mode or switching DC-DC converters use an energy storage device, such as an inductor, to store the input energy and switches to selectively couple the energy storage device to the output.

Common switching converter topologies include Boost and Buck-Boost. In Boost converters, the output voltage across load is higher than the input voltage; and in Buck-Boost converters, the output voltage across load can be either higher or lower than the input voltage. Boost converters are governed by the transfer function Vout=Vin/(1-D), where D is the duty cycle of the power switch and generally have better efficiency than Buck-Boost converters. The Buck-Boost converter transfer function is given by Vout=Vin (D/1-D). Buck-Boost converters are advantageous because of their flexibility in output voltage, but generally impose higher voltage stress on the power switch and have higher power losses.

Typical LED systems include an application specific number and configuration of LEDs, a regulator to provide a controlled current to the LED load, and a controller to control the regulator. Some LED applications require the use of multiple parallel strings of series-coupled LEDs and others require only a single string of series-coupled LEDs. Generally controlling the LED current is simpler in the case of a single LED string since the regulator can provide a controlled current to the LED string based on a simple feedback arrangement, such as sensing the voltage across a sense resistor coupled in series with the load.

In some applications for single string LED loads, a bypass or shunt switch may be used to selectively switch in and out a portion of the LEDs in order to achieve different illumination levels. One such application is in automotive head lamps in which part of the LED string can be selectively switched in and out in order to toggle between high beam operation and low beam operation of the head lamps.

Some LED applications require the ability to dim the LEDs. With one type of LED dimming, sometimes referred to as PWM dimming, the intensity of the LEDs is adjusted by turning the LEDs off and on in response to a PWM signal at a variable duty cycle proportional to the desired brightness and with a fixed DC current and frequency (typically 100 Hz to 1 KHz). The PWM signal may be provided to the LED driver from an external source or may be internally generated.

SUMMARY

A driver coupled to a configurable load includes a first switch coupled between an intermediate node of the load and a converter supply voltage and a second switch coupled between the converter supply voltage and a reference potential. A slew rate control circuit is responsive to a command input signal and to a feedback voltage across the first and second switches and is configured to generate a first switch control signal with a first controllable slew rate for coupling to a control terminal of the first switch and a second switch control signal with a second controllable slew rate for coupling to a control terminal of the second switch.

With this described arrangement, the driver can control an operational mode of a converter that generates the load supply voltage and can also configure the load in a manner that provides smooth transitions. In embodiments, the converter can operate in a Boost mode or in a Buck-Boost mode. The load can be an LED load in which part of the load can be bypassed for a low beam configuration and the entire load can be supplied in a high beam configuration. The described slew rate control can reduce or even eliminate damaging inrush currents that can occur when part of the load is bypassed (i.e., when the load voltage is reduced) or when the operational mode of the converter is changed from Buck-Boost to Boost mode. The slew rate control can further reduce or even eliminate load current undershoot that can result in LED flickering when the partially bypassed load is transitioned to the full load (i.e., when the load voltage is increased) or when the operational mode of the converter is changed from Boost to Buck-Boost mode.

Features may include one or more of the following, alone or in combination. The slew rate control circuit may be configured to detect a rate of change of the feedback voltage and the controllable slew rate of the switch control signals may be based on the detected rate of change of the feedback voltage. A first state of the second switch control signal can cause the second switch to turn on to operate the converter in a Boost mode and a second state of the second switch control signal can cause the second switch to turn off to operate the converter in a Buck-Boost mode. The command input signal can include a first command input signal portion that controls a configuration of the load and a second command input signal portion that controls whether the converter operates in Boost mode or in Buck-Boost mode.

The slew rate control circuit may include a state machine responsive to the first command input signal portion and the second command input signal portion to generate the first and second switch control signals. The load may be a headlamp including a plurality of series-coupled LEDs and the configuration of the load can include a high beam configuration or low beam configuration. The first and second switches can include FETs and the feedback voltage can be a voltage between a drain terminal of the first switch and a source terminal of the second switch.

In an embodiment, the slew rate control circuit includes a slope detector responsive to the feedback voltage and configured to generate a slope signal indicative of the rate of change of the feedback voltage and an operational amplifier responsive to the slope signal and to a reference voltage for generating a slew rate control signal. The slew rate control circuit may further include a level shifter configured to shift the level of the slope signal and coupled between the slope detector and the operational amplifier. The slope detector may include an RC circuit having a controllable gain and the gain of the slope detector may be controllable by adjusting one or both of a resistance of a resistor or the capacitance of a capacitor of the RC circuit.

Also described is a method for configuring a load powered by a load voltage generated by a converter, the converter powered by a supply voltage, including coupling a first switch between an intermediate node of the load and the supply voltage, coupling a second switch between the supply voltage and a reference potential, detecting a rate of change of a feedback voltage across the first and second switches, and generating first and second switch control signals for coupling to the first and second switches respectively in response to a command input signal and to the detected rate of change of the feedback voltage.

Features may include one or more of the following, alone or in combination. Generating the second switch control signal in a first state may cause the second switch to turn on to operate the converter in a Boost mode and generating the second switch control signal in a second state may cause the second switch to turn off to operate the converter in a Buck-Boost mode. The command input signal may include a first command input signal portion that controls a configuration of the load and a second command input signal portion that controls whether the converter operates in Boost mode or in Buck-Boost mode.

According to a further aspect of the disclosure, an LED driver configured to drive a configurable LED load powered by a load voltage generated by a converter powered by a supply voltage, includes a first switch having a first terminal coupled to an intermediate node of the load and a second terminal coupled to the supply voltage, wherein the intermediate node is disposed between a first portion and a second portion of the load, a second switch having a first terminal coupled to the supply voltage and a second terminal coupled to a reference potential, and a slew rate control circuit. The slew rate control circuit is responsive to a command input signal and to a feedback voltage across the first switch and the second switch and is configured to generate a first switch control signal with a first controllable slew rate for coupling to a control terminal of the first switch and a second switch control signal with a second controllable slew rate for coupling to a control terminal of the second switch, wherein the command input signal includes a load configuration command and a converter mode command.

Features may include one or more of the following, alone or in combination. The converter may be configured to operate in a Boost mode or in a Buck-Boost mode based on the converter mode command. The LED load may include a headlamp and the load configuration command may correspond to a high beam configuration or a low beam configuration. The slew rate control circuit may be configured to detect a rate of change of the feedback voltage and the controllable slew rate of the first switch control signal and the second switch control signal may be based on the detected rate of change of the feedback voltage.

According to another aspect of the disclosure, a driver coupled to a configurable load powered by a load voltage generated by a converter powered by a supply voltage, includes switch means for configuring the load and a mode of operation of the converter and control means responsive to a command input signal and to a feedback voltage across the switch means for generating a control signal for the switch means. In an embodiment, the switch means includes first switch means having a first terminal coupled to an intermediate node of the load and a second terminal coupled to the supply voltage and second switch means having a first terminal coupled to the supply voltage and a second terminal coupled to a reference potential. The command input signal may include a first command input signal portion that controls a configuration of the load and a second command input signal portion that controls the mode of operation of the converter.

BRIEF DESCRIPTION OF THE DRAWINGS

The foregoing features of the invention, as well as the invention itself may be more fully understood from the following detailed description of the drawings, in which like reference numbers refer to like elements and in which.

DETAILED DESCRIPTION

Figure 1:
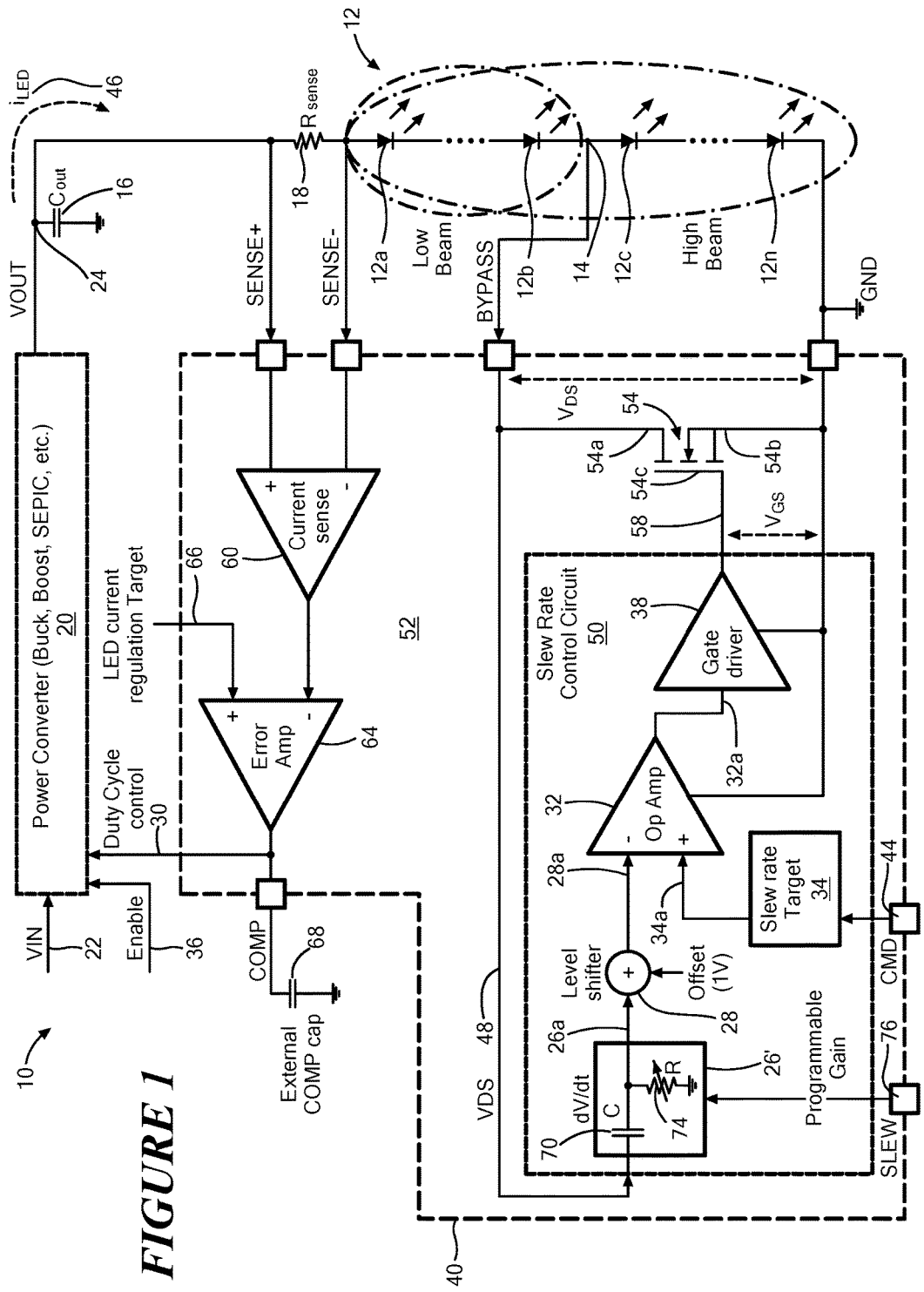
FIG. 1 is a block diagram of an LED driver implementing bypass switch slew rate control of a low side bypass switch.

Referring to FIG. 1, an LED system 10 includes an LED load 12 in the form of a string of series-coupled LEDs 12a-12n, a voltage regulator, or converter 20 configured to generate a regulated output voltage VOUT 24 for coupling to the LED load, and an LED driver 40. The LED driver 40 includes a bypass switch 54, a slew rate control circuit 50, and regulator control circuitry 52. The bypass switch 54 has first and second terminals 54a, 54b coupled across a portion of the LED string 12. In the embodiment of FIG. 1, the first terminal 54a is coupled to an intermediate node 14 of the series-coupled LEDs and a second terminal 54b is coupled to a reference potential such as ground. A control terminal 54c is coupled to the slew rate control circuit 50.

The slew rate control circuit 50 is responsive to a command input signal CMD 44 and to a feedback voltage 48 associated with the bypass switch 54 (herein, the bypass switch feedback voltage) and is configured to generate a control signal 58 with a controllable slew rate for coupling to the control terminal 54c of the bypass switch 54. The slew rate control circuit 50 will be described in detail below. Suffice it to say here that the circuit 50 is configured to detect a rate of change of the bypass switch feedback voltage 48 and to establish the slew rate of the bypass switch control signal 58 in response to the detected rate of change of the feedback voltage.

With this arrangement, the slew rate control circuit 50 controls the slew rate of the bypass switch 54 in such a way as to ensure smooth transitions between the switch 54 turning on (when part of the load is bypassed to present a partially bypassed load) and the switch turning off (when the full load 12 is presented) by ensuring that the regulator control loop can remain in control and regulate the LED current during such transitions. Control of the bypass switch slew rate in the described manner can reduce and even eliminate potentially damaging inrush currents to the load that can otherwise occur as a result of the charge stored on the regulator output capacitor 16 causing inrush currents when part of the load is bypassed (i.e., when the bypass switch is turned on and the load and therefore also the output voltage is abruptly reduced). Bypass switch slew rate control can also minimize load current undershoot that can result in LED flickering when the partially bypassed load is transitioned to the full load (i.e., when the bypass switch is turned off and the load and therefore also the output voltage is abruptly increased).

The LED load 12 in the form of a string of series-coupled LEDs 12a-12n includes an intermediate node 14 between a first portion of LEDs (e.g., 12c-12n) and a second portion of the LEDs (e.g., 12a-12b). In one operating mode of the system 10, a portion of the load 12 may be bypassed to present a reduced, partially bypassed load to the regulator 20. Such an operating mode may correspond to a low beam mode of operation of a head lamp unit. Here the portion of the load is bypassed by turning on the bypass switch 54 to thereby shunt the intermediate node 14 to ground. In another operating mode of the system 10, the full load 12 may be presented to the regulator 20, as may be achieved by turning off the bypass switch 54. It will be appreciated that the portions of LEDs on either "side" of the intermediate node 14 (i.e., the portion that is bypassed by the switch 54 turning on and the portion that is not bypassed when the switch 54 turns on) can include any number of LEDs suitable for the given application, including one LED.

The voltage regulator 20 may have any suitable topology depending on the relationship between the input voltage VIN 22 and VOUT 24. Example regulators include SEPIC regulators, Boost regulators, ZETA regulators, Buck regulators, or Buck-Boost regulators. The illustrated regulator 20 is a Boost regulator and is responsive to the input voltage VIN 22, an enable signal 36 (as may be used for PWM dimming as explained below), and a duty cycle control signal 30 and is configured to generate the regulated output voltage VOUT 24 across output capacitor 16.

In operation, the regulator 20 is controlled by the duty cycle control signal 30 so as to adjust the output voltage VOUT 24 as necessary to maintain a substantially constant load current $i_{LED}$ 46. The regulator 20 and its control circuitry 52 may implement various types of conventional control schemes such as PWM control, including current mode control or voltage mode control. A sense resistor 18 is coupled between the output of the voltage regulator VOUT 24 and the load 12 and the voltage across the resistor 18 is fed back to the regulator control circuitry 52 and more specifically to a current sense comparator 60. The current sense comparator 60 provides a current error signal to an error amplifier 64 that is further responsive to an LED current regulation target signal 66 that is associated with a target LED current $i_{LED}$ 46, which signal 66 can be preset or predetermined internally to the driver 40 or can be user selectable or programmable or otherwise provided from a source external to the driver. The output of the error amplifier 64 provides a duty cycle control signal COMP 30 across a capacitor 68, which capacitor may be internal or external with respect to the driver 40. The error amplifier 64 and capacitor 68 serve to integrate the duty cycle control signal 30 to achieve smooth voltage regulation by the regulator 20. With this arrangement, if the LED current $i_{LED}$ 46 is below the regulation target 66, then the regulator 20 will increase its duty cycle in response to the duty cycle control signal 30 to increase the output voltage VOUT 24; whereas if the LED current $i_{LED}$ 46 is above the regulation target 66, then the regulator 20 will decrease its duty cycle in response to the duty cycle control signal to decrease the output voltage VOUT 24.

The bypass switch 54 may take various forms. In the illustrated embodiment, the switch 54 is a Field Effect Transistor (FET) and specifically an NMOS FET. Thus, the first bypass switch terminal 54a may correspond to a drain terminal, the second bypass switch terminal 54b may correspond to a source terminal, and the control terminal 54c of the bypass switch may correspond to a gate terminal. Accordingly, in this example embodiment, the bypass switch feedback voltage 48 corresponds to the drain to source voltage ($V_{DS}$) of the FET 54.

It will be appreciated that other types of switches, including a PMOS FET or an npn or a pnp bipolar transistor may alternatively be used. Also, it will be appreciated that, while the bypass switch 54 is shown to be a single switch element, multiple switches coupled in parallel may be used and/or multiple switches not coupled in parallel and coupled to different portions of LEDs 12a-12n may be provided to achieve independent control of one or more of the LEDs. In other words, while a single switch 54 is shown to bypass a respective portion of the LED string corresponding to LEDs 12c-12n and to thereby permit the load 12 to be in two different configurations, it is possible to provide multiple bypass switches, each coupled across a different respective portion of LEDs in order to thereby permit the load to be configured in more than two different ways. Furthermore, while the illustrated bypass switch 54 is shown to be a so-called "low side switch" that shunts the intermediate node 14 to ground, it is also possible to implement the described bypass switch slew rate control in a high-side switch configuration, as will be described below in connection with FIG. 5.

The slew rate control circuit 50 is responsive to the command input signal CMD 44 and also to the bypass switch feedback voltage 48. In an embodiment in which the LED load 12 is a head lamp unit, the command input signal 44 can be an user provided, externally generated signal to command the reconfiguration of the load to present a partial load during low beam operation (by causing the bypass switch 54 to turn on) and a full load during high beam operation (by causing the bypass switch 54 to turn off). More generally however, the command input signal CMD 44 can be internally or externally generated and can be any input signal configured to command the bypass switch 54 to turn on and off in order to thereby present the load in a first configuration associated with a first mode of operation or in a second configuration associated with the a second mode of operation. Accordingly, the command input signal 44 can be thought of as a mode command or a configuration command since the signal commands the bypass switch to turn on or off and thereby to configure the load to be in one of two configurations that may correspond to one of two operating modes. Herein, operation of the driver under the control of the command input signal CMD 44 will be referred to as mode command operation.

As noted, the slew rate control circuit 50 generates the bypass switch control signal 58 with a controllable slew rate. More particularly, the slew rate control circuit 50 is configured to detect a rate of change of the bypass switch feedback voltage 48 and the slew rate of the bypass switch control signal 58 is controlled in response to the detected rate of change of the feedback voltage 48. To this end, the slew rate control circuit 50 includes a slope detector 26' coupled to the bypass switch feedback voltage 48 and configured to generate a slope signal 26a indicative of the rate of change of the feedback voltage.

Figure 2:
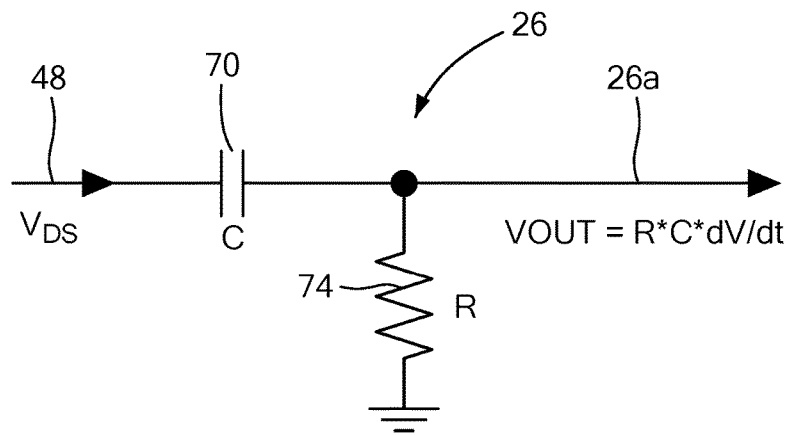
FIG. 2 shows an example slope detector for use in the LED driver of FIG. 1.
Figure 2:
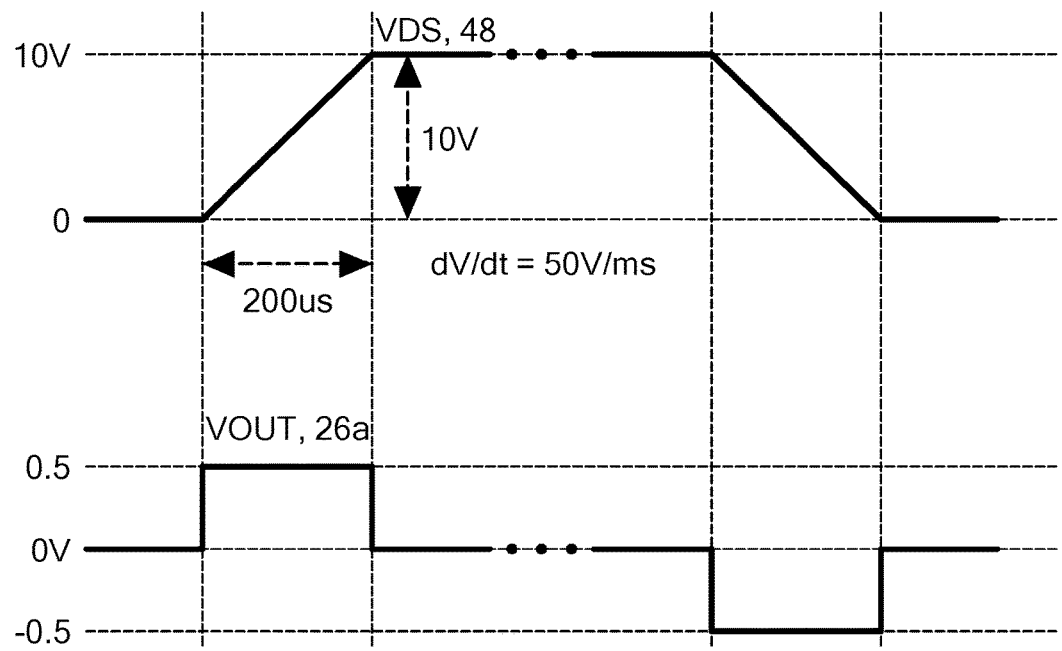

Referring also to FIG. 2, an example slope detector 26 can include a simple RC circuit arrangement including a resistor 74 and a capacitor 70. Also shown in FIG. 2 is an example feedback voltage 48, here corresponding to $V_{DS}$ of the bypass switch 54, and a resulting output voltage of the slope detector 26, here corresponding to the slope signal 26a. The relationship of the slope signal 26a to the input voltage 48 is given by R*C*dV/dt. Thus, for an example feedback voltage slew rate of 50V/ms (based on an example output voltage change of 10V over 200 µs), the resulting slope signal 26a is at a level of 0.5V, where resistor 74 has a resistance on the order of 10 KΩ and capacitor 70 has a capacitance on the order of 1 nF.

Referring again to FIG. 1, the slope detector 26' is similar to the circuit of FIG. 2, except that a variable resistor 74' is provided in place of resistor 74 of FIG. 2 and a programmable gain input signal 76 can be provided to adjust the resistance of resistor 74'. By changing the resistance of variable resistor 74', the gain of the slope detector 26 can be varied to achieve a desired bypass switch transition time as will be described. Here, a programmable gain input signal 76 is coupled to the slope detector 26' in order to select a desired slope detector gain. The programmable gain input signal 76 can be preset or predetermined or can be user selectable or programmable or otherwise provided from a source external to the driver.

The slew rate control circuit 50 may optionally further include a level shifter 28 coupled between the slope detector 26 and an operational amplifier 32 to shift the level of the slope signal 26a as may be desired for further processing. In an embodiment, the level shifter 28 may shift the slope signal 26a to be always a positive voltage. For example, the slope signal 26a may vary between −0.5V and +0.5V and the level shifter 28 may respond to an offset input of 1V to adjust the slope signal to vary between 0.5V and 1.5V. It will be appreciated however, that in some embodiments the level shifter 28 may be omitted.

Operational amplifier 32 is responsive to the level-shifted signal 28a (or to the slope signal 26a in embodiments without the level shifter) and to a slew rate target reference signal 34a for generating a slew rate control signal 32a. By comparing the measured slew rate signal 28a to the slew rate target reference signal 34a, the operational amplifier 32 causes the bypass switch control signal 58 to begin transitioning in response to the command input signal 44 and to do so at a rate established by the slew rate control signal 32a. In an embodiment, the command input signal 44 may be provided to a look up table or element by which states of the command signal are converted into a corresponding slew rate target reference signal 34a. For example, in an embodiment in which the load 12 is a head lamp and the command input signal 44 is a two-state signal in which a high voltage level corresponds to a high beam mode of operation and a low signal level corresponds to a low beam mode of operation, the slew rate target circuit 34 may provide the slew rate target reference signal 34a on the order of 0.5V when the command signal 44 is in a high state to command high beam operation and may provide the slew rate target reference signal 34a on the order of 1.5V when the command signal is in a low state to command low beam operation.

With the described arrangement, the operational amplifier 32 compares the level shifted signal 28a (or the slope signal 26a in embodiments without the level shifter 28) that is indicative of the measured slew rate of the bypass switch 54 with the slew rate target reference signal 34a to generate a slew rate control signal 32a. A gate driver 38 is responsive to the slew rate control signal 32a to generate the bypass switch control signal 58.

The LED driver 40 may be provided in the form of an integrated circuit (IC). In such configurations, it will be appreciated that the particular delineation of circuit elements internal and external to the IC may be readily varied to suit a particular application. In other words, various components shown as contained within the IC driver 40 may alternatively be provided external to the IC and vice versa. As one of many examples, the bypass switch 54 may alternatively be provided external to the driver 40. It will also be appreciated that other types of circuit implementations are possible including discrete circuit components, hybrids, and other subassemblies.

As will now be apparent, certain parameters of the slew rate control circuit 50 are selectable or programmable or otherwise adjustable in order to achieve a desired bypass switch slew rate or in other words a desired transition time for the bypass switch 54 to turn on and off (herein "the transition time"). It will be appreciated that the longer the bypass switch transition time, the easier it is for the regulator control circuitry 52 to maintain the LED current $I_{LED}$ 46 constant during output voltage changes as will occur when the load is switched between configurations. The tradeoff however is that the longer the transition time, the higher the losses in the bypass switch 54.

A lower limit to the transition time is the time it takes the output capacitor 16 to discharge when the output voltage 24 drops. In particular, if the LED current $i_{LED}$ 46 is regulated, then the fastest rate that the output voltage VOUT 24 can drop is limited by $dVOUT/dt=i_{LED}/C$, where C is the output capacitor 16. For example, if capacitor 16 has a capacitance of 10 µF and $i_{LED}$ is 0.5 A, then dVOUT/dt=0.05V/µs. Thus, if there is an output voltage change ΔVOUT of 10V between the high beam operation and low beam operation, then a transition time of at least 200 µs is necessary for the bypass switch 54 to turn from off to on.

In practice, the regulator 20 has limited response time and cannot cut off its output voltage 24 immediately. For example, assuming that the gain bandwidth of the regulator control loop is on the order of GBW=10 kHz, approximately three to five times longer than 1/GBW should be allocated to ensure smooth transition of output voltage. Thus, in this example, a transition time on the order of between approximately 300-500 µs may be desirable. The following equation can be used to estimate the total transition time required:

$$\text{Transition time}=\Delta VOUT/(i_{LED}/C)+3*(1/GBW)$$

It will be appreciated that each application of the driver 40 and more specifically of the slew rate control circuit 40 may have different factors and values contributing to the selection of transition time. Once a desired transition time is determined and the bypass switch threshold voltage (i.e., the gate to source voltage required to be applied to the bypass switch in order for the switch to conduct) is known, then the bypass switch slew rate can be determined.

In order to achieve the determined desirable bypass switch slew rate, the slew rate control circuit 50 includes one or more adjustable (i.e., programmable) parameters or variables. Here, the gain of the slope detector 26 and/or the slew rate target reference signal 34a may be individually or collectively adjusted to achieve the desired transition time and thus, the desired slew rate for the bypass switch transitions. In some embodiments, a smaller range of slew rate variation can be implemented by adjusting the slew rate target signal 34a than by adjusting the gain of the slope detector 26.

Figure 3:
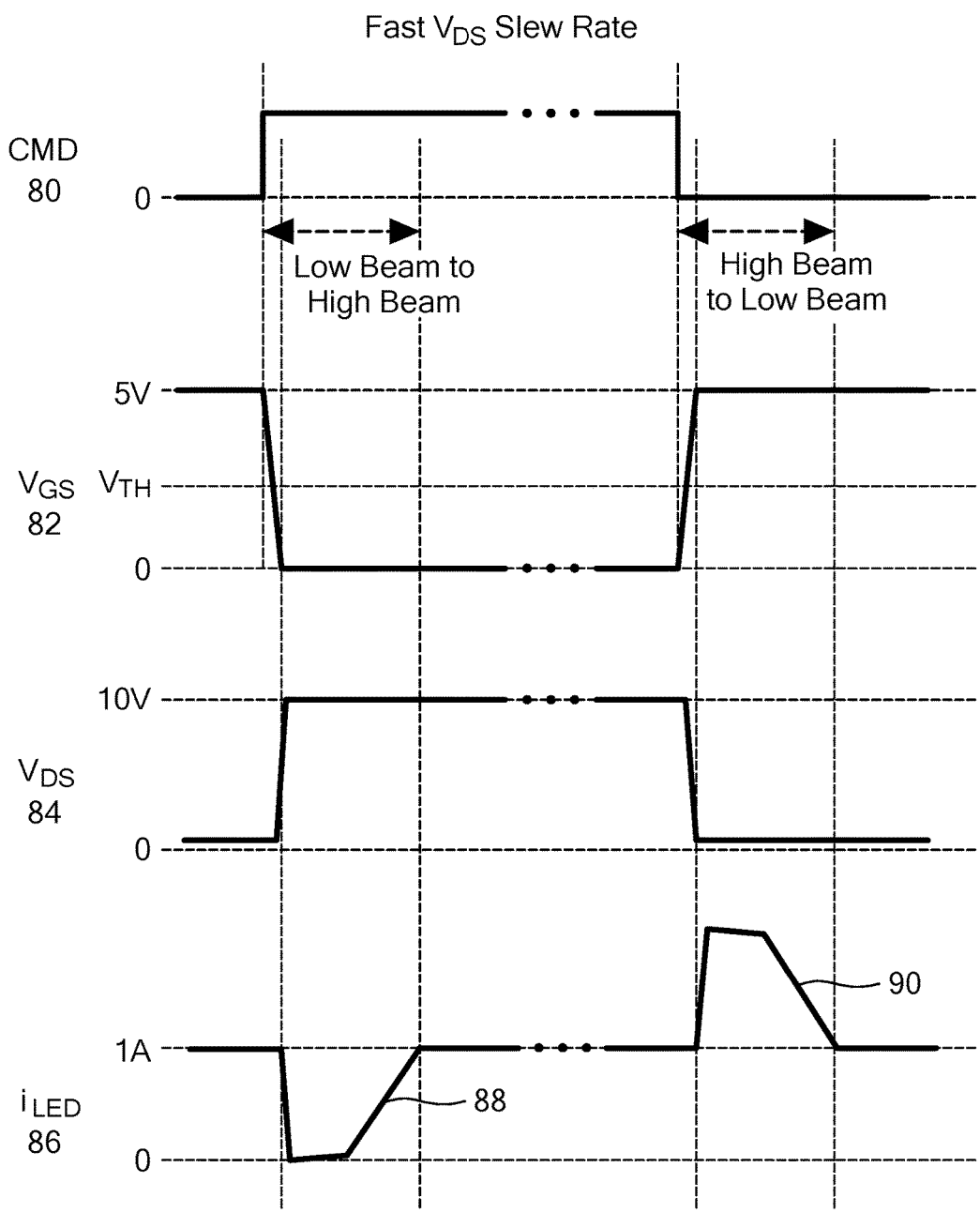
FIG. 3 shows several example waveforms associated with a conventional LED driver that does not contain the slew rate control circuit.

Referring also to FIG. 3, example waveforms are shown as might occur in a conventional LED driver that does not contain the slew rate control circuit of FIG. 1, such conventional LED driver not shown. In other words, the waveforms of FIG. 3 might occur in an LED driver in which a command input signal CMD is directly coupled a gate driver for a bypass switch associated with an LED load that may take the same or a similar form to the LED load 12 of FIG. 1, but for which switch there is no slew rate control implemented. The command input signal 80 toggles from a low logic level to a high logic level to command the bypass switch to open (e.g., to enter a high beam mode of operation) and from the logic high level to the logic low level to command the bypass switch to close (e.g., to enter a low beam mode of operation). A gate to source voltage $V_{GS}$ 82 of the bypass switch responds directly but inversely to the command signal 80 by transitioning from a high level to a low level in order to thereby turn off the switch or by transitioning from a low level to a high level in order to thereby turn on the switch, as shown.

As a result of the bypass switch turning off, the load (again, as may be the same as or similar to the load of FIG. 1) transitions from a partial load configuration requiring less regulated voltage to maintain the desired LED current to a full load configuration requiring more regulated voltage to maintain the desired LED current. This abrupt increase in the required output voltage results in undershoot 88 of the load current $i_{LED}$ 86. Conversely, as a result of the bypass switch turning on, the load transitions from a full load requiring more output voltage to maintain the desired LED current to a partial load requiring less output voltage. The result of this abrupt decrease in required output voltage is that the charge previously stored in the regulator output capacitor can cause a potentially damaging inrush current 90 to be delivered to the load. LED current undershoot 88 can cause visible flickering of an LED load and LED overshoot 90 can damage the LEDs.

Figure 4:
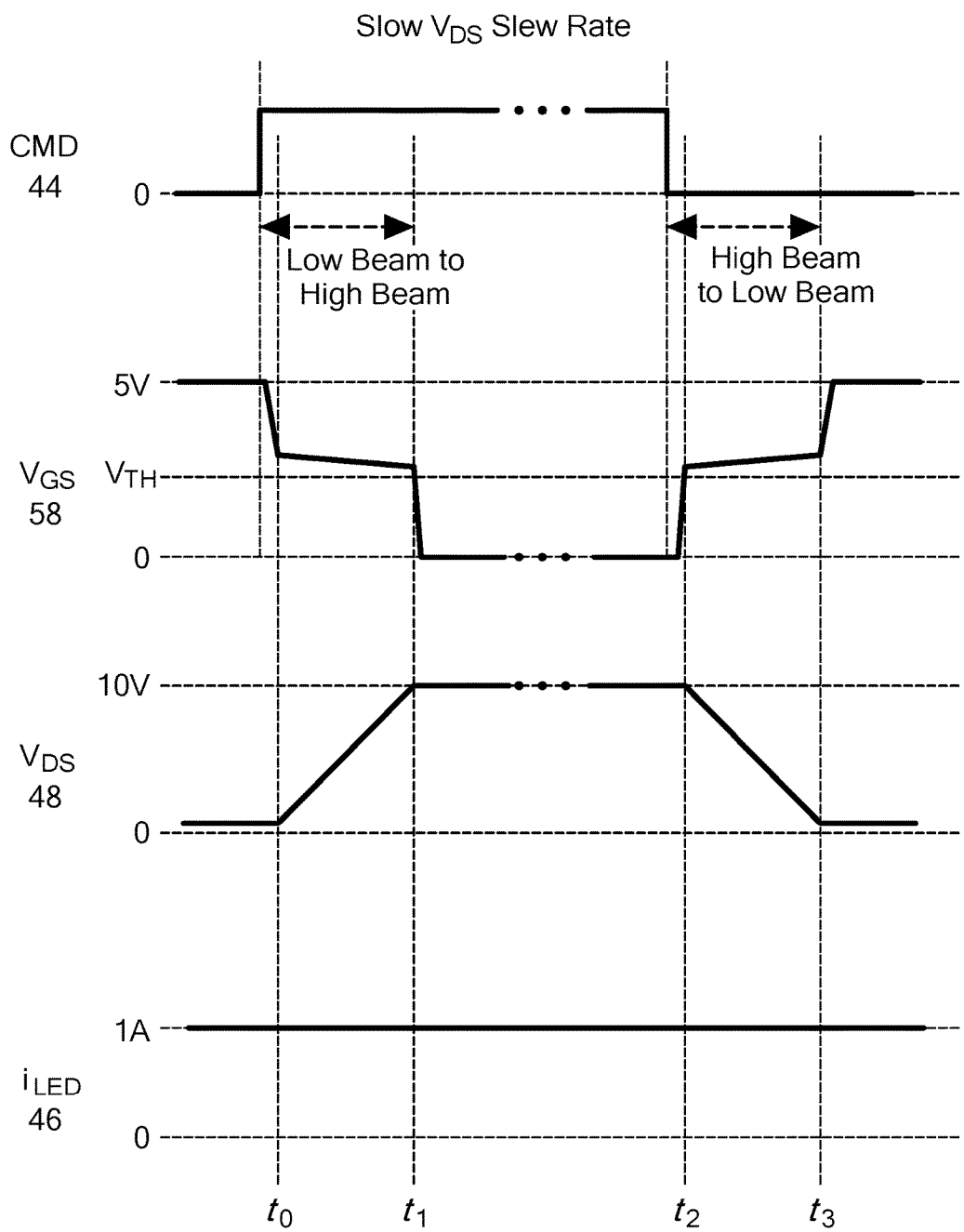
FIG. 4 shows several example waveforms associated with the LED driver of FIG. 1 containing bypass switch slew rate control.

Referring now to FIG. 4, example waveforms associated with the LED system 10 of FIG. 1 (which system includes the bypass switch slew rate control circuit 50 and implements associated methods) illustrate how such LED current overshoot and undershoot conditions can be reduced, and in some cases eliminated, during mode or command input signal transitions. In the example in which the load 12 is a light, the command input signal 44 may control whether the light operates in a first mode such as a high beam mode or a second mode such as a low beam mode. The command input signal 44 transitioning from the low logic level to the high logic level may command the bypass switch 54 to open (e.g., to enter a full load, or high beam mode of operation) and the command input signal 44 transitioning from the logic high level to the logic low level may command the bypass switch to close (e.g., to enter a partial load, or low beam mode of operation).

In response to a low to high level transition of the command signal 44 and with parameters the slew rate control circuit 50 selected to achieve a desired transition time and bypass switch slew rate as explained above, the bypass switch feedback voltage $V_{DS}$ 48 begins to rise at a time t0 and continues to rise during the desired transition time that ends at t1. The slope of this $V_{DS}$ rise is detected by the slope detector 26' and processed by the slew rate control circuit 50 as explained above to generate the bypass switch control signal $V_{GS}$ 58. The bypass switch control signal $V_{GS}$ 58 begins to drop until the conduction threshold $V_{TH}$ of the switch 54 is reached. Because of the non-linear turn on characteristics of the switch 54, the $V_{GS}$ voltage 58 remains at about the conduction threshold level $V_{TH}$ until the desired transition time ends at time t1 at which time the $V_{GS}$ voltage reaches ground, as shown. Conversely, in response to the command input signal 44 transitioning from a logic high level to a logic low level at a time t2, the bypass switch feedback voltage $V_{DS}$ 48 begins to fall and continues to fall during the desired transition time between times t2 and t3. The slope of this $V_{DS}$ fall is detected by the slope detector 26' and processed by the slew rate control circuit 50 as explained above to generate the bypass switch control signal $V_{GS}$ 58. The bypass switch control signal $V_{GS}$ 58 begins to increase until the conduction threshold $V_{TH}$ of the switch 54 is reached and thereafter, because of the non-linear turn off characteristics of the switch 54, remains at about the conduction threshold level $V_{TH}$ until the desired transition time ends at time t3, as shown. The result of this lengthened transition time (as compared to the waveforms of FIG. 3) is the reduction or even elimination of load current overshoot over undershoot.

Although not shown in FIG. 4, it will be appreciated that in practice, some undershoot and overshoot may occur. In general, a disturbance in LED current $i_{LED}$ 46 of approximately 10% or less is generally acceptable as it will not cause visible flickering. In fact, it may even be desirable to optimize the slew rate control circuit parameters to allow for a small amount of overshoot or undershoot since the longer the transition time the more bypass switch losses will occur.

Figure 5:
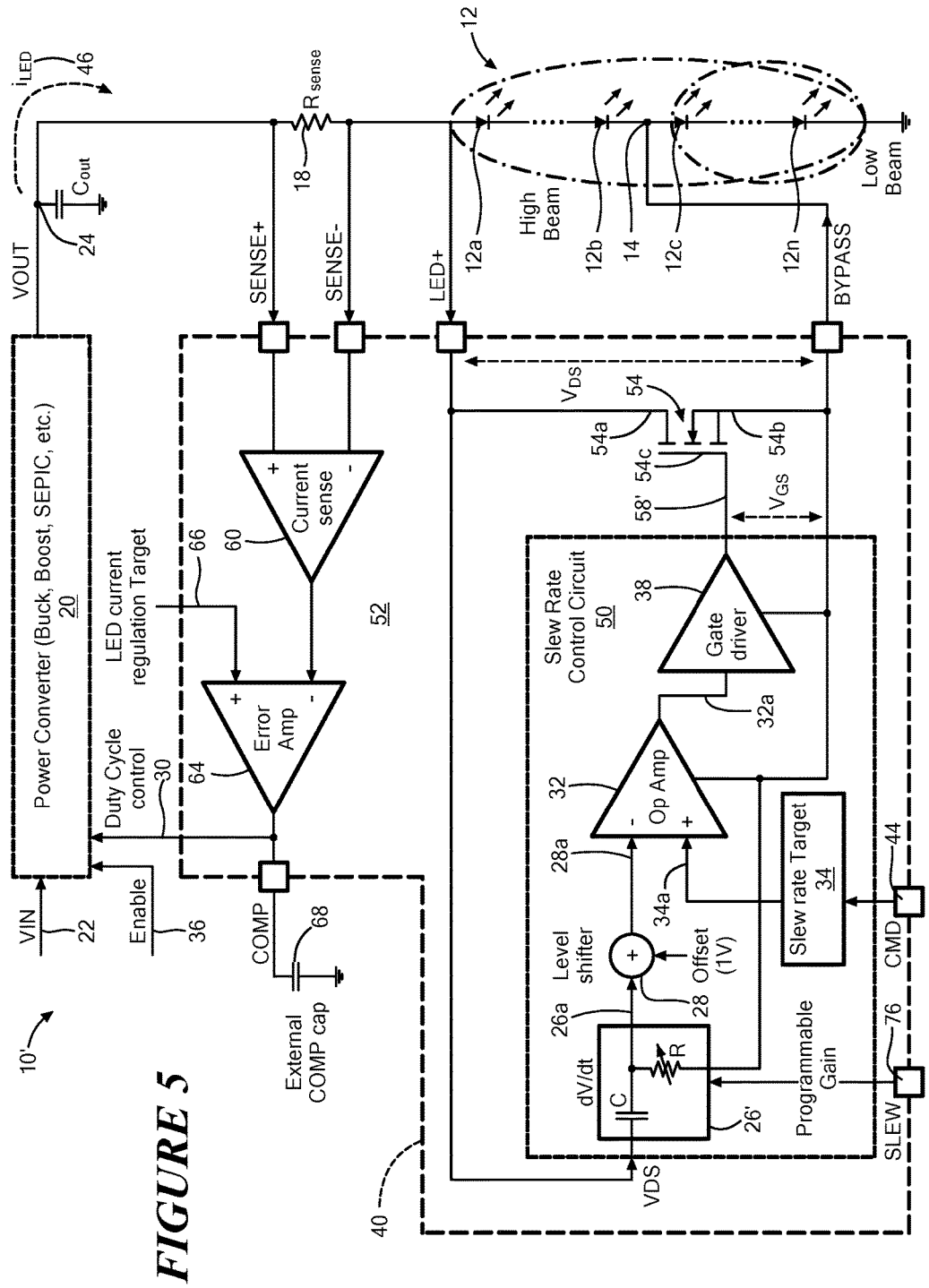
FIG. 5 is a block diagram of an LED driver with switch slew rate control of a high side bypass switch.

Referring to FIG. 5, an alternative LED system 10' is shown to include many of the same components and circuits as FIG. 1 including LED driver 40, as indicated by like reference numbers. The system 10' differs from the system 10 in that the bypass switch 54 is here configured as a so-called high side switch meaning that the first and second terminals 54a, 54b that are coupled across a portion (here across LEDs 12a-12b) are floating rather than being tied to a reference potential such as in the case of the low side switch in FIG. 1. Stated differently, neither the first or second terminals 54a, 54b are tied to ground.

More specifically, the first terminal 54a, here the drain terminal, is coupled to a first end of the LED string 12 and the second terminal 54b, here the source terminal, is coupled to the intermediate node 14. In operation in response to a first state of the command input signal 44 and under the control of the slew rate control circuit 50, when the bypass switch 54 is turned on, a portion of the LED string including LEDs 12a-12b is shunted to thereby present a partial load to the regulator 20; whereas in response to a second state of the command input signal and again, under the control of the slew rate control circuit 50, when the bypass switch 54 is turned off the full load 12 is presented to the regulator 20. In this high side configuration, the slew rate control circuit is thus referenced to the intermediate node 14 of the LED string 12 rather than to ground. In all other relevant respects, the system 10' operates in the same manner as system 10 of FIG. 1 to control the slew rate of the bypass switch.

Figure 6:
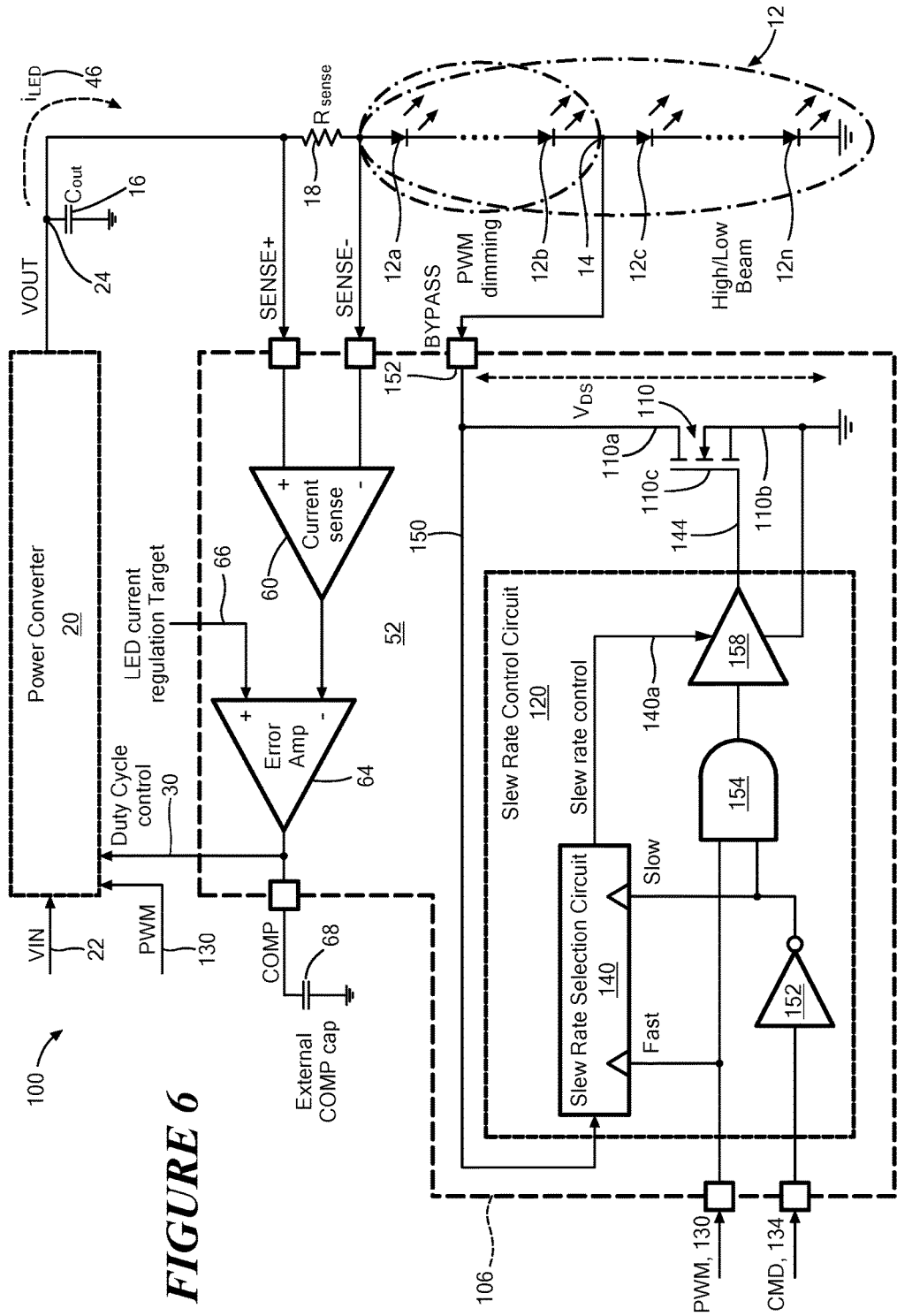
FIG. 6 is a block diagram of an LED driver implementing bypass switch slew rate control and PWM dimming according to the disclosure.

Referring to FIG. 6, an LED system 100 including an LED driver 106 capable of implementing bypass switch slew rate control or PWM dimming is shown in which like reference characters refer to like elements with respect to FIG. 1. Bypass switch slew rate control is as described above. PWM dimming is an operational mode in which the LEDs 12 are rapidly turned on and off at a controlled duty cycle to achieve a dimming effect. By selective control of a PWM signal 130 and a command input signal 134, the LED driver 106 can control a bypass switch 110 to implement either a mode command operation or PWM dimming operation.

In applications in which the slew rate control circuit 120 is used to implement mode command operation under control of a CMD signal 134, the LED load includes the series-coupled LEDs 12a-12n configured as shown so that when the bypass switch 110 is closed, a portion of the LED string including LEDs 12c-12n are bypassed. In applications in which the slew rate control circuit 120 implements PWM dimming, the LED load includes series-coupled LEDs coupled between the sense resistor 18 and input terminal 152 to the driver 106, here shown as LEDs 12a, 12b, but more generally any number of LEDs so coupled. In other words, to implement PWM dimming, additional LEDs coupled between intermediate node 14 and ground for mode command operation (here LEDs 12c-12n) are omitted. With this PWM dimming load configuration, when the bypass switch 110 is turned on, current $i_{LED}$ flows through the LED load; whereas, when the bypass switch 110 is off, the flow of current through the load is interrupted. The power converter stage 20 is synchronized with the PWM signal. It is enabled when LED current is on, and disabled when LED current is off.

The slew rate control circuit 120 includes a slew rate selection circuit 140 having a fast slew rate input 140a and a slow slew rate input 140b. Generally, the bypass switch slew rate during PWM dimming will be significantly faster than for mode command operation. Typically the PWM frequency is at 200 Hz or higher to avoid visible flickering. Accordingly, the PWM signal 130 is coupled to the fast slew rate input 140a and when mode command operation is desired, the command input signal 134 is coupled to the slow slew rate input 140b. The slew rate selection circuit 140 includes several of the same elements as the slew rate control circuit 50 of FIG. 1 and specifically, includes a slope detector (like slope detector 26' of FIG. 1) coupled to receive the bypass switch feedback voltage 150 and generate a slope signal indicative of the rate of change of the feedback voltage 150, an optional level shifter (like level shifter 28 of FIG. 1) to shift the level of the slope signal, and an operational amplifier configured to compare the measured rate of change of the feedback voltage 150 (in the form of the slope signal or the level shifted version of the slope signal) to a slew rate target reference signal (that may be the same as or similar to signal 34a of FIG. 1). Here however, the slew rate target reference signal is associated with either the PWM signal 130 where PWM dimming operation is implemented or with the command input signal 134 where bypass switch operation is implemented. More specifically, the slew rate selection circuit 140 may include a first set of slew rate target reference signal levels corresponding to different states of the PWM signal 130 and a second, different set of slew rate target reference signal levels corresponding to different states of the command input signal 134. In one embodiment, a slew rate target reference signal level associated with the PWM signal 130 may provide a fast bypass switch slew rate, such as on the order of 10V in 10 µs, and a slew rate target reference signal level associated with the command input signal 134 may provide a slower bypasss switch slew rate, such as on the order of 10V in 1 ms. The operational amplifier of the slew rate selection circuit 140 may be the same as or similar to operational amplifier 32 of FIG. 1 and thus, may be responsive to a slew rate target reference signal and to the measured slew rate signal to generate a slew rate control signal 140a. In practice, this change in reference target can be easily achieved by changing the gain of the dV/dt detection stage as shown in FIG. 2.

The PWM signal 130 and an inverted version (following inverter 152) of the CMD signal 134 are additionally coupled to an AND gate 154. The output of the AND gate 154 is coupled to an output driver 158 that may be the same as or similar to driver 38 of FIG. 1 and that generates the bypass switch control signal 144.

In applications in which the slew rate control circuit 120 implements mode command operation, PWM dimming can nevertheless still be provided in a conventional manner; namely, the LEDs 12 may be turned on and off by turning the regulator 20 on and off in response to the PWM signal 130 being coupled to an enable input of the regulator 20, as shown.

Figure 7:
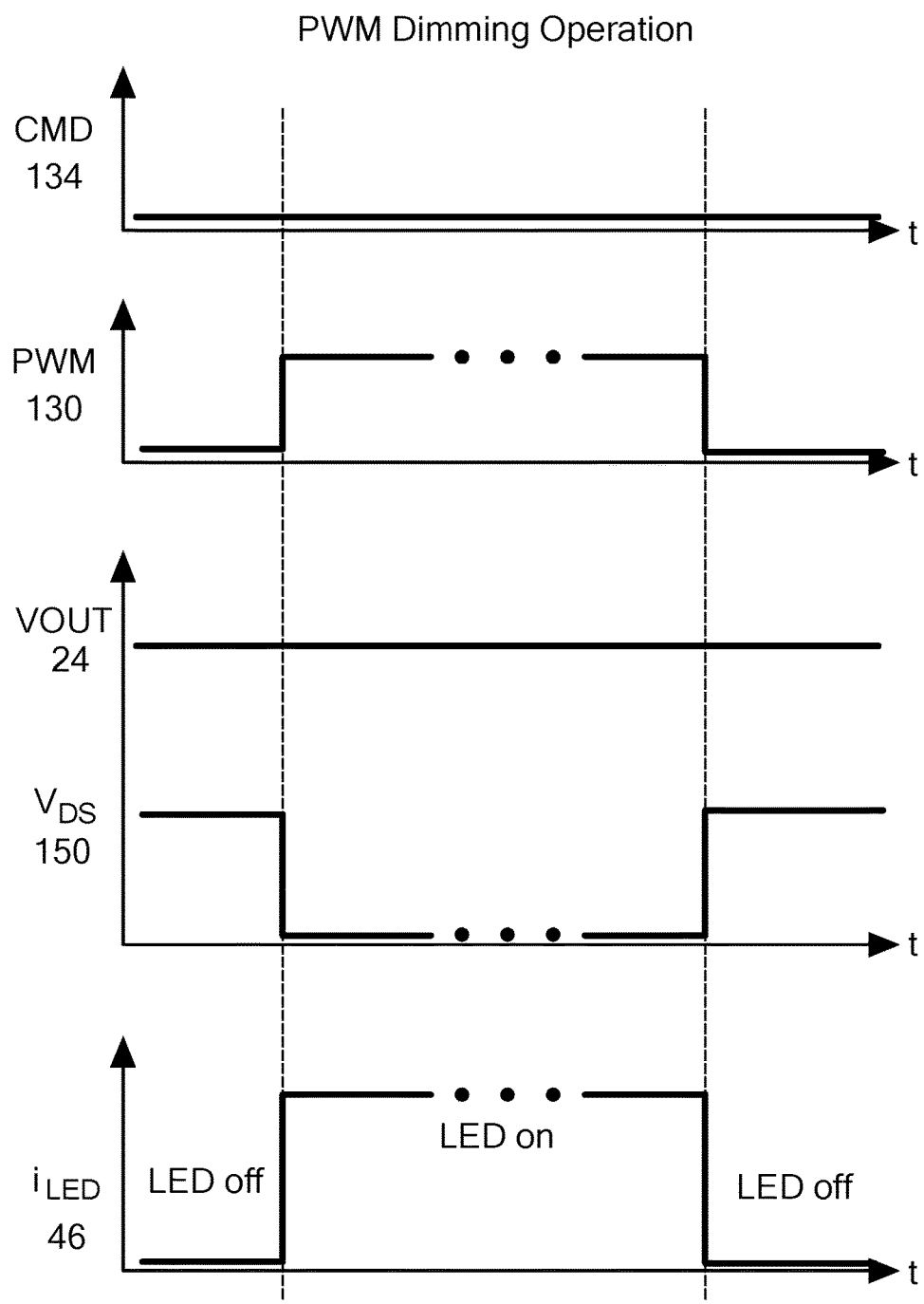
FIG. 7 shows several example waveforms associated with the LED driver of FIG. 6 in a PWM dimming mode of operation.

Referring also to FIG. 7, examples waveforms are shown to illustrate PWM dimming operation of the LED system 10'. In order to initiate PWM dimming, the CMD signal 134 is held at a low logic level, and the PWM signal 130 is toggled to a logic high level causing the bypass switch to turn on and to a logic low level causing the bypass switch 110 to turn off, with such toggling occurring at a rapid rate. In one example, when activated, the PWM dimming signal 130 has a frequency on the order of 200 Hz. The PWM input signal 130 can be provided to the LED driver 100 from an external source or may be internally generated. When the bypass switch 110 turns on, the LED current $i_{LED}$ 46 flows through the LED load 12a-12b, causing the switch feedback voltage 150 ($V_{DS}$) to collapse. The slope of this fast $V_{DS}$ drop is sensed by the slew rate selection circuit 120 in the manner explained above and the desired slew rate established by the slew rate selection circuit 120 is implemented by the resulting bypass switch control signal 144. When the PWM signal 130 transitions to a logic low level, the bypass switch 110 is turned off, thereby interrupting the flow of load current $i_{LED}$ as shown and causing the $V_{DS}$ voltage 150 to rise at a slew rate established and controlled by the slew rate control circuit 120.

Implementing PWM dimming with the slew rate control circuit 120 permits the bypass switch slew rate to be adjusted to optimize electromagnetic interference (EMI) performance. In other words, the bypass switch slew rate can be tuned to achieve a desired immunity to EMI effects.

Figure 8:
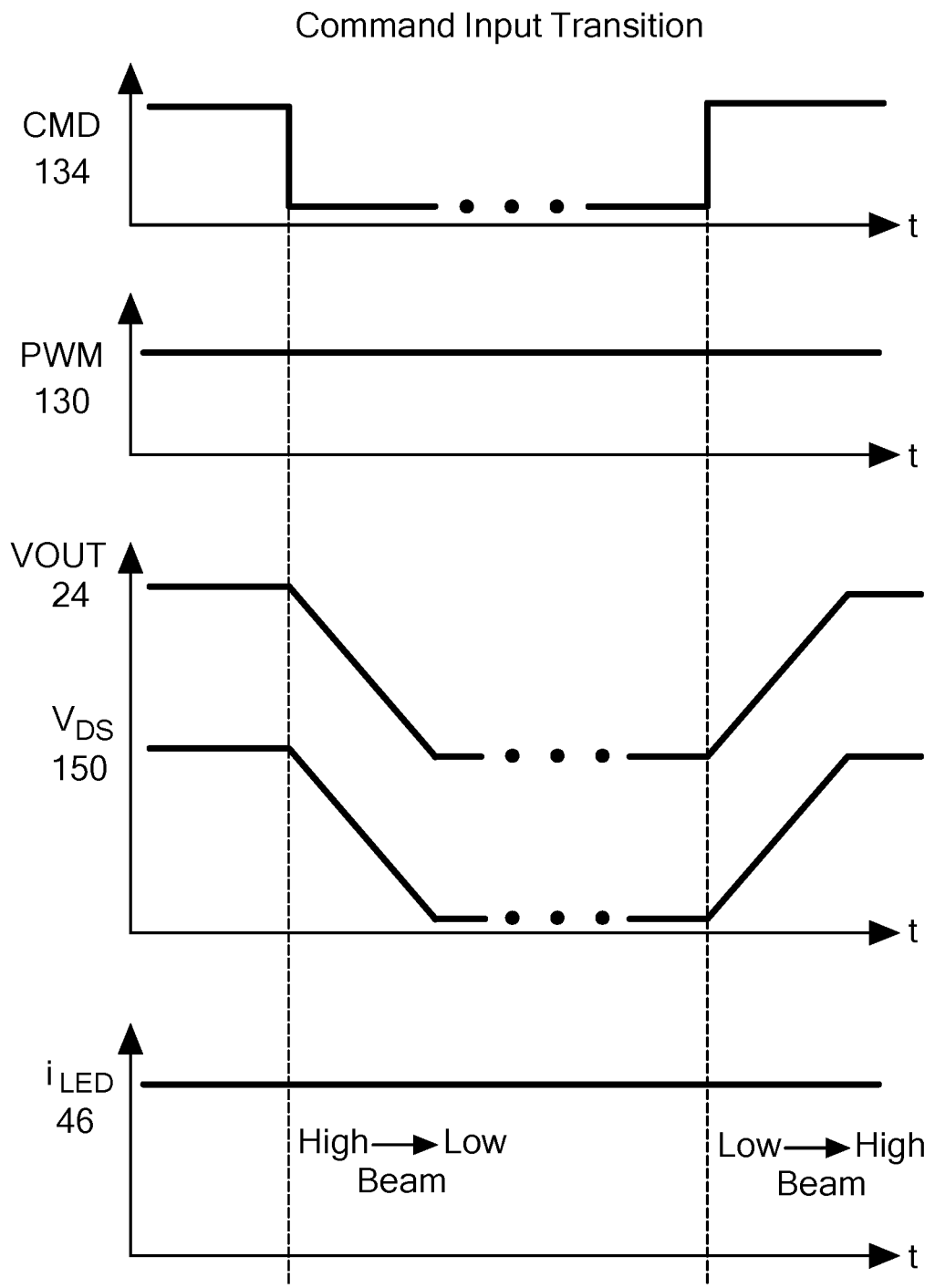
FIG. 8 shows several example waveforms associated with the LED driver of FIG. 6 in a high/low beam mode.

Referring also to FIG. 8, examples waveforms are shown to illustrate mode command operation of the LED system 10' in response to the CMD signal 134. In order to initiate mode command operation, the PWM signal 130 is held at logic high level, and the CMD signal 134 is toggled as desired to effect mode command operation, which in one embodiment can be high beam and low beam operation of an LED light. With the PWM signal 130 held high, the inverted version of the CMD signal as provided at the output of the inverter 152 passes through the AND gate 154 the driver 158, as shown. With the command input signal 134 thus in control of the bypass switch, operation and the relevant waveforms are as described above in connection with FIG. 4. As explained above, by selection and/or adjustment of the slew rate control circuit parameters (e.g., the slope detector gain and/or the target slew rate reference signal), the desired bypass switch transition time and slew rate is achieved in a manner that reduces or even minimizes load current overshoot and undershoot when a mode transition occurs in response to the command input signal.

Given the relative frequencies of the PWM signal 130 and the CMD signal 134, it will be appreciated that the time scale of FIG. 7 is significantly compressed with respect to the time scale of FIG. 8.

Figure 9:
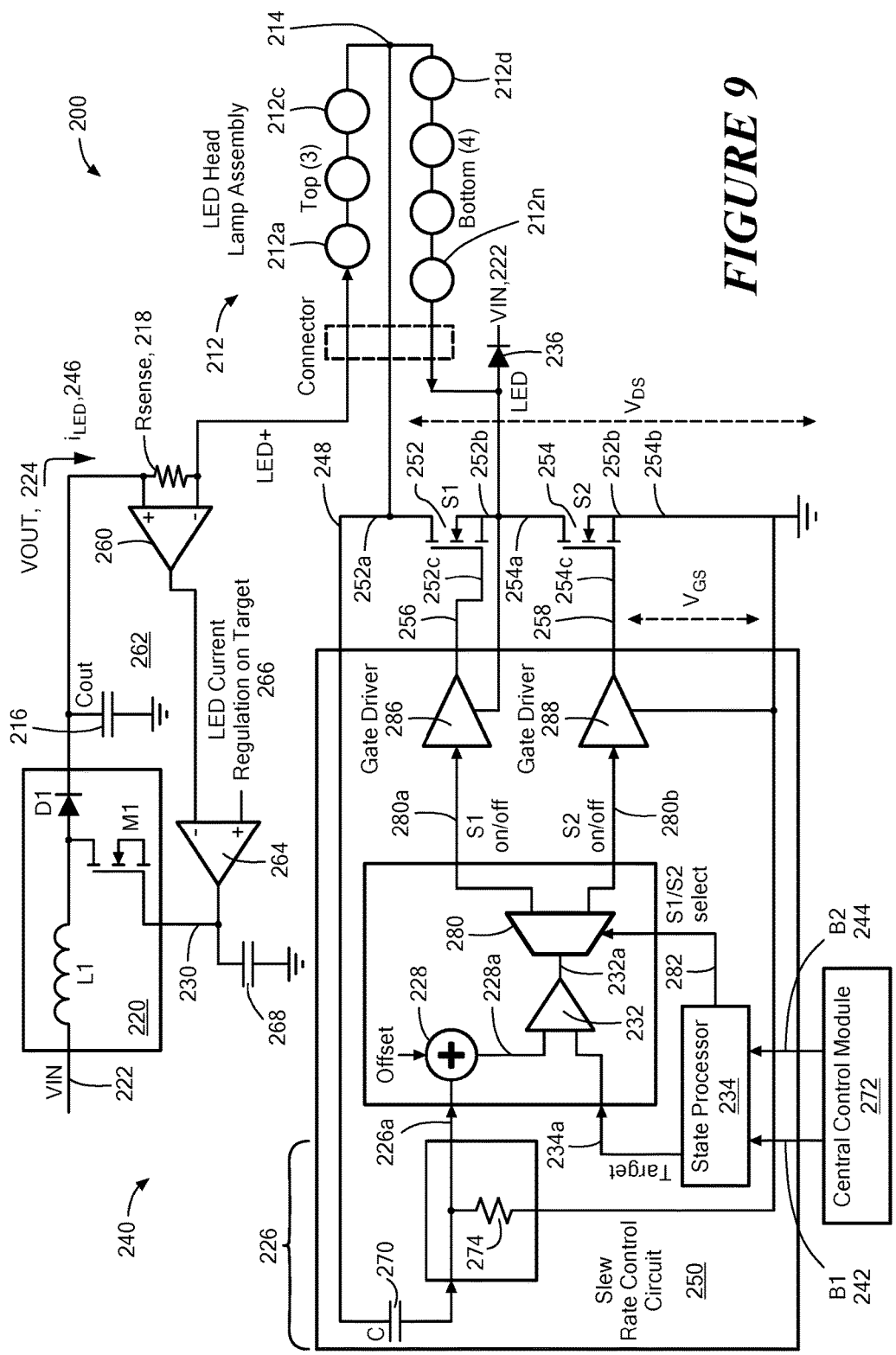
FIG. 9 is a block diagram of a driver coupled to a configurable load.

Referring to FIG. 9, a system 200 includes a configurable load 212, a voltage regulator, or converter 220 that receives power from a supply voltage VIN 222 and is configured to generate a regulated output voltage VOUT 224 for coupling to the load, and a driver 240. The driver 240 includes first and second switches 252, 254, a slew rate control circuit 250, and regulator control circuitry 262. Driver 240 (like driver 40 of FIG. 1) may be provided in the form of an integrated circuit (IC) and the particular delineation of circuit elements internal and external to the IC may be varied to suit a particular application.

The first switch 252 has a first terminal 252a coupled to an intermediate node 214 of the load and a second terminal 252b coupled to the supply voltage VIN 222 through a diode 236. The second switch 254 has a first terminal coupled to the supply voltage VIN 222 through diode 236 and a second terminal coupled to a reference potential, here ground. Slew rate control circuit 250 is responsive to a command input signal 242, 244 and a feedback voltage 248 across the first and second switches 252, 254. The slew rate control circuit 250 is configured to generate a first switch control signal 256 with a first controllable slew rate for coupling to a control terminal 252c of the first switch 252 and a second switch control signal 258 with a second controllable slew rate for coupling to a control terminal 254c of the second switch 254.

The slew rate control circuit 250 will be described in detail below. Suffice it to say here that the circuit 250 is configured to detect a rate of change of the feedback voltage 248 and to establish the slew rate of the first switch control signal 256 and the second switch control signal 258 based on the detected rate of change of the feedback voltage.

With this arrangement, both the load configuration and the converter operational mode are controllable in a manner that ensures smooth transitions between the switches 252, 254 turning on and off by ensuring that the regulator control loop can remain in control and regulate the load current $i_{LED}$ 246 during such transitions. Control of the switch slew rate in the described manner can reduce and even eliminate potentially damaging inrush currents to the load that can otherwise occur when part of the load is bypassed and can also minimize load current undershoot when the partially bypassed load is transitioned to the full load.

In embodiments, load 212 may be the same as or similar to load 12 (FIG. 1) and thus, may take the form of an LED load including a string of series-coupled LEDs 212a-212n with an intermediate node 214 between a first portion of LEDs (e.g., 212a-212c) and a second portion of the LEDs (e.g., 212d-212n). Accordingly, one load configuration may have a portion of the load 212 bypassed by closing (i.e., turning on) the first switch 252 in accordance with a low beam configuration and another load configuration may utilize the entire load by opening (i.e., turning off) the first switch 252 in accordance with a high beam configuration.

In the embodiment of FIG. 9, the voltage regulator 220 can operate in different modes and in particular can operate in a Boost mode by closing second switch 254 to provide a higher output voltage VOUT 224 than input voltage 222 or in a Buck-Boost mode by opening the second switch 254 to provide an output voltage across load 212 (which is approximately VOUT−VIN) that may be higher or lower than the input voltage VIN 222. Regulator 220 is responsive to the input voltage VIN 222 and a duty cycle control signal 230 and is configured to generate the regulated output voltage across load 212.

In operation, regulator 220 is controlled by the duty cycle control signal 230 so as to adjust the output voltage VOUT 224 as necessary to maintain a substantially constant load current $i_{LED}$ 246. The regulator 220 and its control circuitry 262 may implement various types of conventional control schemes such as PWM control, including current mode control or voltage mode control. A sense resistor 218 is coupled between the output of the voltage regulator VOUT 224 and the load 212 and provides a sense voltage to a current sense comparator 260. The current sense comparator 260 provides a current error signal to an error amplifier 264 that is further responsive to an LED current regulation target signal 266 that is associated with a target LED current $i_{LED}$ 246, which signal 266 can be preset or predetermined internally to the driver 240 or can be user selectable or programmable or otherwise provided from a source external to the driver. The output of the error amplifier 264 provides a duty cycle control signal COMP 230 across a capacitor 268, which capacitor may be internal or external to the driver 240. The error amplifier 264 and capacitor 268 serve to integrate the duty cycle control signal 230 to achieve smooth voltage regulation by the regulator 220. With this arrangement, if the LED current $i_{LED}$ 246 is below the regulation target 266, then the regulator 220 will increase its duty cycle in response to the duty cycle control signal 230 to increase the output voltage VOUT 224; whereas if the LED current $i_{LED}$ 246 is above the regulation target 266, then the regulator 220 will decrease its duty cycle in response to the duty cycle control signal to decrease the output voltage VOUT 224.

The first and second switches 252, 254 may be the same as or similar to switch 54 (FIG. 1) and may take various forms such as the illustrated NMOS FETs. Thus, terminals 252a, 254a may correspond to drain terminals, terminals 252b, 254b may correspond to source terminals, and terminals 252c, 254c may correspond to gate terminals of respective switches 252, 254. Accordingly, in this example embodiment, the feedback voltage 248 corresponds to a combined drain to source voltage ($V_{DS}$) across both FETs 252, 254. As with the previous embodiments, other types, numbers, and configurations of switches may be used to provide the first and second switches 252, 254.

The slew rate control circuit 250 is responsive to the command input signal, here shown in the form of two command input signals B1 242, B2 244, and also to the feedback voltage 248. It will be appreciated that although the command input signal is here shown as two separate signals B1 242, B2 244, the command input signal can instead take the form of a single signal that includes separate portions (e.g., a serial signal format). As used herein, the terms first command input signal and first command input signal portion are used interchangeably (and likewise the terms second command input signal and second command input signal portion are used interchangeably) to refer to portions of a single signal or different signals (like illustrated signals B1 242, B2 244).

The command input signal can be generated by a control module 272 and can include first command input signal portion B1 242 to control the load configuration and second command input signal portion B2 244 to control the converter mode of operation. In an embodiment in which the load 212 is an LED headlamp unit, a first state of the first command input signal B1 242 can command high beam operation and a second state of the first command input signal B1 242 can command low beam operation. It will be appreciated that in other applications, different load configurations are possible.

A first state of the second command input signal B2 244 can cause second switch 254 to close to command Boost converter operation and a second state of the second command input signal B2 244 cause second switch 254 to open to command Buck-Boost converter operation. More particularly, with the second switch 254 closed, the source terminal 252b of the first switch 252 is coupled to ground; whereas with the second switch 254 open, the source terminal 252b of the first switch 252 is coupled back to the supply voltage VIN 222. It will be appreciated that other applications, other converter modes are possible.

The control module 272 can take the form of a processor such as a central control module in an automobile application and can provide the command input signals B1 242, B2 244 based on the activation state of a headlamp switch and the automobile battery voltage level (which battery supplies the input voltage VIN 222 to the converter 220). More generally however, the command input signal can take the form of a single signal, the illustrated two signals B1 242, B2 244, or even more signals and can be internally or externally generated to command the first and second switches 252, 254 to turn on and off in order to thereby configure the load and control the converter operational mode in order to achieve system optimization and to satisfy system requirements.

The slew rate control circuit 250 generates the first switch control signal 256 for coupling to a control terminal 252c of the first switch 252 and a second switch control signal 258 for coupling to a control terminal 254c of the second switch 254. More particularly, the slew rate control circuit 250 is configured to detect a rate of change of the feedback voltage 248 and the slew rates of the first and second switches 252, 254 are controlled in response to the detected rate of change of the feedback voltage 248. To this end, the slew rate control circuit 250 includes a slope detector 226 coupled to the feedback voltage 248 and configured to generate a slope signal 226a indicative of the rate of change of the feedback voltage.

An example slope detector 226 can include an RC circuit arrangement including a resistor 274 and a capacitor 270. Slope detector 226 can be the same as or similar to slope detector 26' of FIG. 1. The resistance of resistor 274 and/or the capacitance of capacitor 270 can be adjustable in order to thereby adjust the slew rate of the switch control signals 256, 258. By changing the resistance or capacitance, the gain of slope detector 226 can be varied to achieve a desired switch transition time. Furthermore, the resistor 274 and/or capacitor 270 can be internal to an integrated circuit driver 240 or alternatively can be external components. Thus, resistance and/or capacitance can be preset or predetermined or can be user selectable or programmable or otherwise provided from an external source.

Slew rate control circuit 250 may optionally include a level shifter 228 (that can be the same as or similar to level shifter 28 of FIG. 1) coupled between the slope detector 226 and an operational amplifier 232 to shift the level of the slope signal 226a to provide a level-shifted signal 228a. Operational amplifier 232 is responsive to the level-shifted signal 228a (or to the slope signal 226a in embodiments without the level shifter) and to a slew rate target reference signal 234a for generating a slew rate control signal 232a. By comparing the measured slew rate signal 228a to the slew rate target reference signal 234a, the operational amplifier 232 causes a selected switch control signal 256 or 258 to transition at a rate established by the slew rate control signal 232a.

More particularly, the command input signal B1 242, B2 244 is coupled to a state processor 234 which generates the target reference signal 234a and also a switch select signal 282. Select signal 282 is coupled to a control input of a multiplexer 280 having an input coupled to an output of the operational amplifier 232 and outputs 280a, 280b coupled to respective gate drivers 286, 288, as shown.

State processor 234 may include a state machine that responds to states of command input signal B1 242, B2 244 to generate the switch select signal 282 as described in connection with FIG. 10. State processor 234 may further include a look up table with which states of command input signals B1 242, B2 244 are related to a level of the target reference signal 234a. It will be appreciated that the slew rate control circuit 250 can control the slew rate of switch control signals 256, 258 to provide each such signal with the same or different slew rates. It will also be appreciated that the rising slew rate and the falling slew rate of each such switch control signal 256, 258 can be the same or different.

Figure 10:
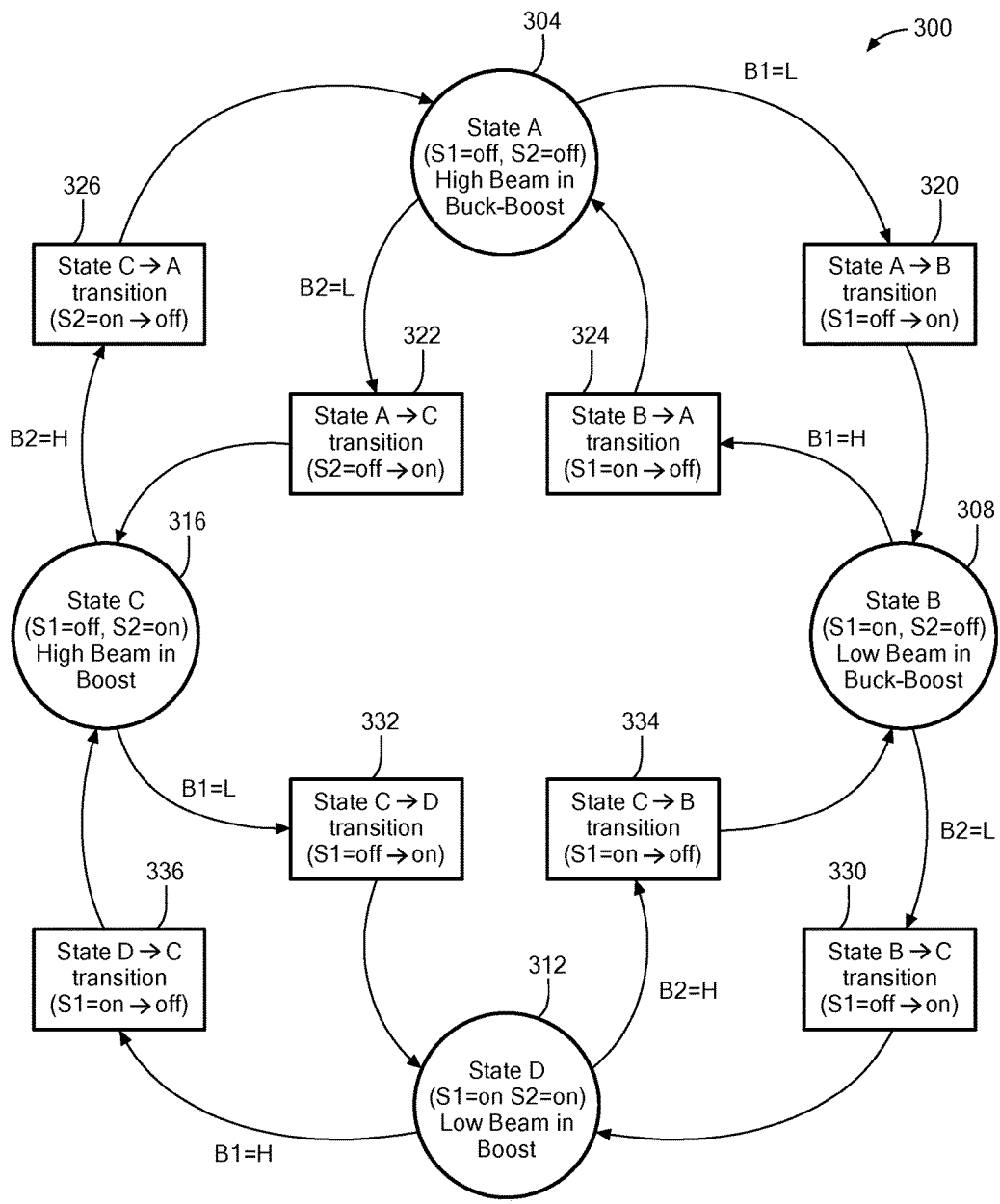
FIG. 10 is a state diagram illustrating operation of the state processor of FIG. 9.

Referring also to FIG. 10, a state diagram 300 illustrates operation of the state processor 234 in generating the switch select signal 282 in response to command input signals B1 242, B2 244. Each state A-D is represented by a respective circle 304, 308, 312, 316, and the transitions between states are indicated by directed lines connecting the circles. Also indicated in each circle is the state of the first and second switches S1 252, S2 254 (i.e., whether the switch is on or off) and an indication of the load configuration and converter mode (i.e., load configuration being high beam or low beam and converter mode being Boost or Buck-Boost). Boxes between the states 304, 308, 312, 316 represent the switch transition occurring between the states.

In state A 304, both the first switch S1 252 and the second switch S2 254 are open (i.e., off). With these switch states in state A, the load 212 is configured for high beam operation and the converter 220 operates in Buck-Boost mode. In an embodiment, these switch states correspond to the command input signals B1 242, B2 244 both being at a logic high level.

In response to command input signal B1 242 transitioning to a logic low level from state A, state B 308 is entered by turning on the first switch S1 252 (as indicated by box 320). Thus, in state B 308, the first switch S1 252 is closed and the second switch S2 254 is open. With these switch states in state B, the load 212 is configured for low beam operation and the converter 220 is in Buck-Boost mode.

In response to command input signal B2 244 transitioning to a logic low level from state A, state C 316 is entered by turning on the second switch S2 254 (as indicated by box 322). Thus, in state C 316, the first switch S1 252 is open and the second switch S2 254 is closed. With these switch states in state C 316, the load 212 is configured for high beam operation and the converter 220 is in Boost mode.

In response to command input signal B1 242 transitioning to a logic high level from state B, state A 304 is entered by turning off the first switch S1 252 (as indicated by box 324). And in response to command input signal B2 244 transitioning to a logic high level from state C, state A 304 is entered by turning off the second switch S2 254 (as indicated by box 326).

From state B 308, in response to the command input signal B2 244 transitioning to a logic low level, state D 312 is entered by turning on the first switch S1 252 (as indicated by box 330). State D can also be entered from state C 316, in response to the command input signal B1 242 transitioning to a logic low level (as indicated by box 332). Thus, in state D 312, the first switch S1 252 is closed and the second switch S2 254 is closed. With these switch states in state D 312, the load 212 is configured for low beam operation and the converter 220 operates in Boost mode.

From state D 312, in response to the command input signal B1 242 transitioning to a logic high level, state C 316 is entered by turning off the first switch S1 252 (as indicated by box 336). And from state D 312, in response to the command input signal B2 244 transitioning to a logic high level, state B is entered by turning off the first switch S1 252 (as indicated by box 334).

It will be appreciated that the particular logic levels of the command input signals B1 242, B2 244 are illustrative only and can be altered and still achieve the above-described operation.

Figure 11:
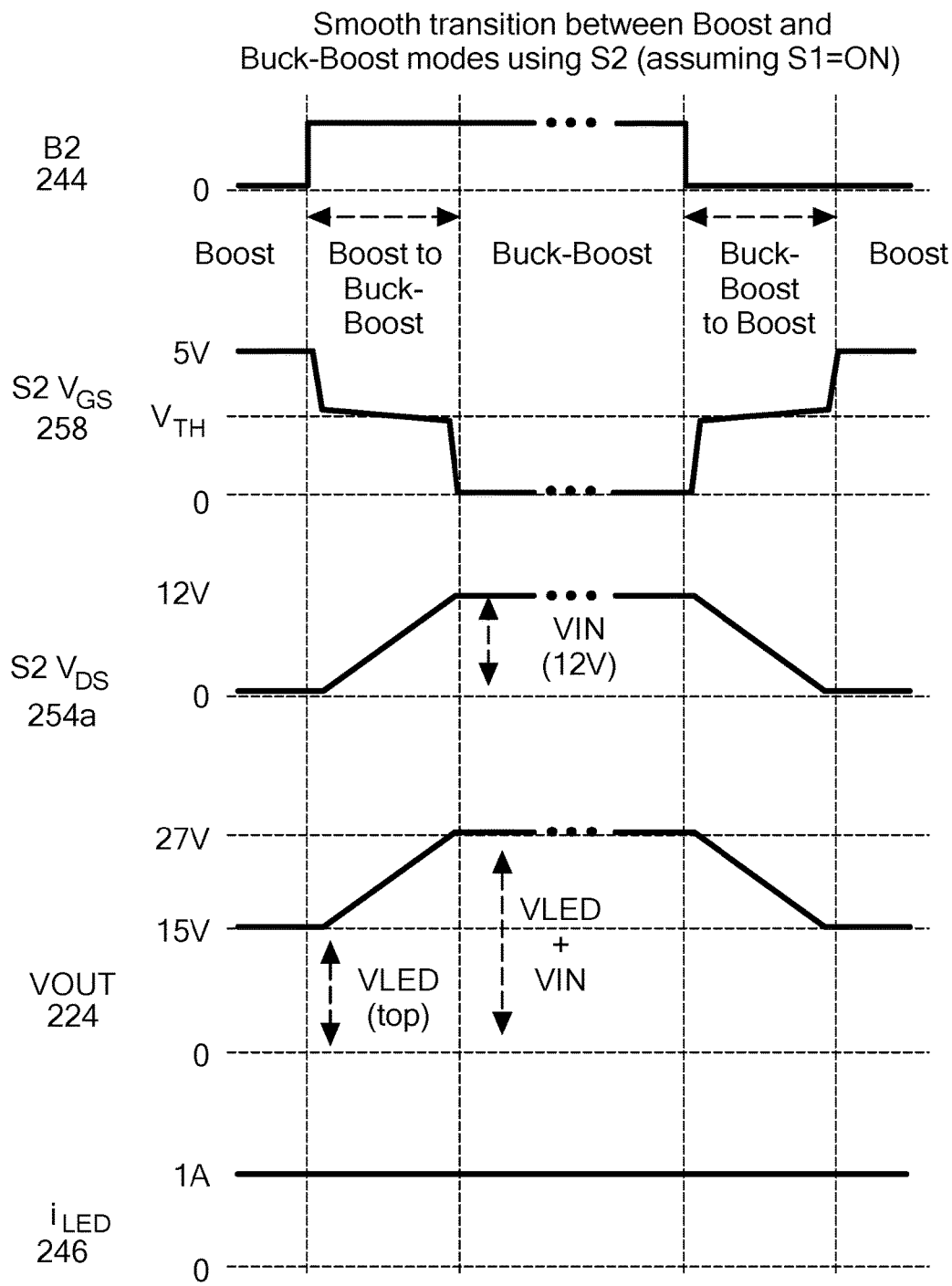
FIG. 11 shows several example waveforms associated with operation of the driver of FIG. 9 to control a mode of operation of the converter.

Referring to FIG. 11, example waveforms associated with the system 200 of FIG. 9 are shown. In the example in which the second command input signal B2 244 controls the mode of operation of converter 220, a transition of signal B2 244 to a high logic level may command a transition from a Boost mode of operation to a Buck-Boost mode (and conversely a transition of signal B2 244 to a logic low level may command a transition from Buck-Boost operation to Boost operation). It is presumed in connection with the FIG. 11 waveforms that the first command input signal B1 242 (that, in embodiments, can control the load configuration) causes the first switch 252 to remain on.

In response to a low to high transition of the signal B2 244 (commencing a transition from Boost mode to Buck-Boost mode), the gate to source voltage 258 of the second switch 254 begins to fall to turn off switch 254, thereby causing the drain to source voltage of second switch 254 (and also the feedback voltage 248) to rise, as shown. The drain to source voltage of the second switch 254 is labeled 254a since it corresponds to the voltage at the switch drain terminal 254a. The rising feedback voltage 248 is detected by the slope detector 226 and processed by the slew rate control circuit 250 to control the second switch control signal $V_{GS}$ 258. The second switch control signal $V_{GS}$ 258 begins to drop until the conduction threshold $V_{TH}$ of the switch 254 is reached. Because of the non-linear turn on characteristics of the switch 254, the $V_{GS}$ voltage 258 remains at about the conduction threshold level $V_{TH}$ until the desired transition time ends, at which time the $V_{GS}$ voltage reaches ground, as shown.

Conversely, in response to the second command input signal B2 244 transitioning from a logic high level to a logic low level, the feedback voltage $V_{DS}$ 248 begins to fall and continues to fall during the desired transition time. The slope of this $V_{DS}$ fall is detected by the slope detector 226 and processed by the slew rate control circuit 250 to generate the second switch control signal $V_{GS}$ 258. The second switch control signal $V_{GS}$ 258 begins to increase until the conduction threshold $V_{TH}$ of the switch 254 is reached and thereafter, because of the non-linear turn off characteristics of the switch 254, remains at about the conduction threshold level $V_{TH}$ until the desired transition time ends, as shown. The result of this lengthened transition time is the reduction or even elimination of overshoot and undershoot of the load current $i_{LED}$ 246.

Figure 11A:
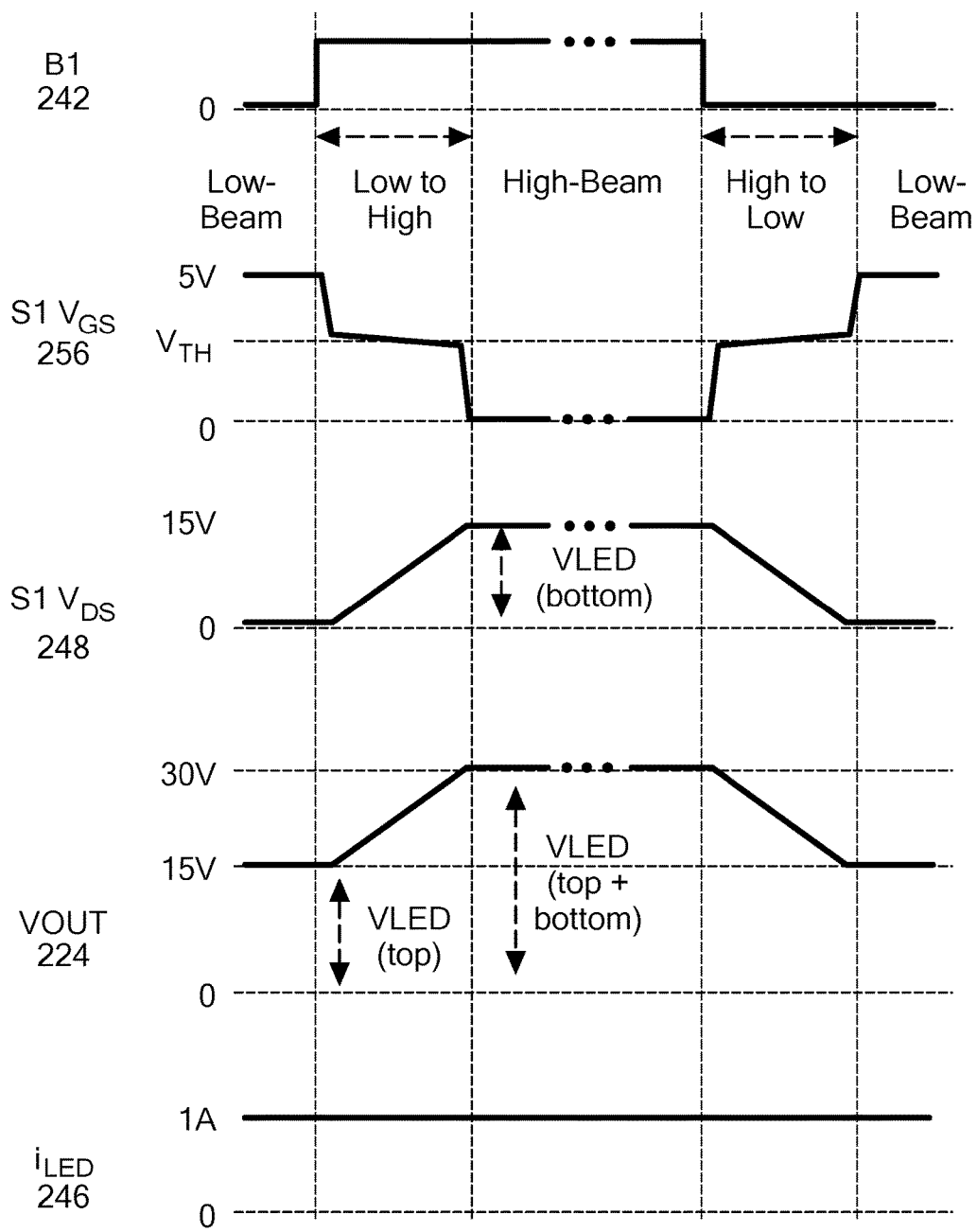
FIG. 11A shows several example waveforms associated with the driver of FIG. 9 to control a configuration of the load.

Referring to FIG. 11A, further example waveforms associated with the system 200 of FIG. 9 are shown. In the example in which the first command input signal B1 242 controls the configuration of load 212, a transition of signal B1 242 to a high logic level may command a transition from a partial load configuration (e.g., a low beam operation of a headlamp load) to a full load configuration (e.g., a high beam operation of a headlamp load (and conversely a transition of signal B1 242 to a logic low level may command a transition from a full load configuration to a partial load configuration). It is presumed in connection with the FIG. 11A waveforms that the second command input signal B2 244 (that, in embodiments, can control the converter mode) causes the second switch 254 to remain on.

In response to a low to high transition of the signal B1 242, the gate to source voltage 256 of the first switch 252 begins to fall to turn off switch 252, thereby causing the drain to source voltage of the first switch 252 (and also the feedback voltage 248 since the second switch 254 is on) to rise, as shown. The rising feedback voltage 248 is detected by the slope detector 226 and processed by the slew rate control circuit 250 to control the first switch control signal $V_{GS}$ 256. The first switch control signal $V_{GS}$ 256 begins to drop until the conduction threshold $V_{TH}$ of the switch 252 is reached. Because of the non-linear turn on characteristics of the switch 252, the $V_{GS}$ voltage 256 remains at about the conduction threshold level $V_{TH}$ until the desired transition time ends, at which time the $V_{GS}$ voltage reaches ground, as shown.

Conversely, in response to the first command input signal B1 242 transitioning from a logic high level to a logic low level, the feedback voltage $V_{DS}$ 248 begins to fall and continues to fall during the desired transition time. The slope of this $V_{DS}$ fall is detected by the slope detector 226 and processed by the slew rate control circuit 250 to generate the first switch control signal $V_{GS}$ 256. The first switch control signal $V_{GS}$ 256 begins to increase until the conduction threshold $V_{TH}$ of the switch 252 is reached and thereafter, because of the non-linear turn off characteristics of the switch 252, remains at about the conduction threshold level $V_{TH}$ until the desired transition time ends, as shown. The result of this lengthened transition time is the reduction or even elimination of overshoot and undershoot of the load current $i_{LED}$ 246.

All references cited herein are hereby incorporated herein by reference in their entirety. Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A driver coupled to a configurable load, the load powered by a load voltage generated by a converter powered by a supply voltage, the driver comprising:
    a first switch having a first terminal coupled to an intermediate node of the load disposed between a first portion of the load and a second portion of the load coupled in series with the first portion of the load, wherein the first switch has a second terminal coupled to the supply voltage and to the second portion of the load, wherein the first switch is coupled in parallel with the second portion of the load;

a second switch having a first terminal coupled to the supply voltage and to a second portion of the load, the second switch having a second terminal coupled to a reference potential; and a slew rate control circuit responsive to a command input signal and to a feedback voltage across the first switch and the second switch, the slew rate control circuit configured to generate a first switch control signal with a first controllable slew rate for coupling to a control terminal of the first switch and to generate a second switch control signal with a second controllable slew rate for coupling to a control terminal of the second switch.

2. The driver of claim 1 wherein the slew rate control circuit is further configured to detect a rate of change of the feedback voltage and wherein the controllable slew rate of the first switch control signal and the second switch control signal are based on the detected rate of change of the feedback voltage.

3. The driver of claim 2 wherein a first state of the second switch control signal causes the second switch to turn on to operate the converter in a Boost mode and wherein a second state of the second switch control signal causes the second switch to turn off to operate the converter in a Buck-Boost mode.

4. The driver of claim 3 wherein the command input signal comprises a first command input signal portion that controls the first switch to control a configuration of the load and a second command input signal portion that controls the second switch to control whether the converter operates in the Boost mode or in the Buck-Boost mode.

5. The driver of claim 4 wherein the slew rate control circuit further comprises a state machine responsive to the first command input signal portion and the second command input signal portion to generate the first and second switch control signals.

6. The driver of claim 4 wherein the load comprises a headlamp comprising a plurality of series-coupled LEDs, wherein the configuration of the load comprises a first state corresponding to a high beam configuration in which the first switch is off so that the first portion and the second portion of the load are on, and a second state corresponding to a low beam configuration in which the first switch is on so that the first portion if the load is off and the second portion of the load is on.

7. The driver of claim 1 wherein the first and second switches comprise FETs and wherein the feedback voltage comprises a voltage between a drain terminal of the first switch and a source terminal of the second switch.

8. The driver of claim 2 wherein the slew rate control circuit comprises:
a slope detector responsive to the feedback voltage and configured to generate a slope signal indicative of the rate of change of the feedback voltage; and
an operational amplifier responsive to the slope signal and to a reference voltage for generating a slew rate control signal.

9. The driver of claim 8 wherein the slew rate control circuit further comprises a level shifter configured to shift the level of the slope signal and coupled between the slope detector and the operational amplifier.

10. The driver of claim 8 wherein the slope detector comprises an RC circuit having a controllable gain.

11. The driver of claim 10 wherein the gain of the slope detector is controllable by adjusting one or both of a resistance of a resistor or the capacitance of a capacitor of the RC circuit.

12. A method for configuring a load powered by a load voltage generated by a converter, the converter powered by a supply voltage, the method comprising:
coupling a first switch between an intermediate node of the load disposed between a first portion of the load and a second portion of the load coupled in series with the first portion of the load, wherein the first switch has a second terminal coupled to the supply voltage and to the second portion of the load, wherein the first switch is coupled in parallel with the second portion of the load;
coupling a second switch between the supply voltage and a reference potential, wherein the second switch has a first terminal coupled to the supply voltage and to a second portion of the load and a second terminal coupled to the reference potential;
detecting a rate of change of a feedback voltage across the first and second switches; and
generating first and second switch control signals for coupling to the first and second switches respectively in response to a command input signal and to the detected rate of change of the feedback voltage.

13. The method of claim 12 wherein generating the second switch control signal in a first state comprises turning on the second switch to operate the converter in a Boost mode and wherein generating the second switch control signal in a second state comprises turning off the second switch to operate the converter in a Buck-Boost mode.

14. The method of claim 13 wherein the command input signal comprises a first command input signal portion that controls a configuration of the load via the first switch and a second command input signal portion that controls whether the converter operates in the Boost mode or in the Buck-Boost mode via the second switch.

15. An LED driver configured to drive a configurable LED load, the load powered by a load voltage generated by a converter powered by a supply voltage, comprising:
a first switch having a first terminal coupled to an intermediate node of the load and a second terminal coupled to the supply voltage, wherein the intermediate node is disposed between a first portion of the load and a second portion of the load coupled in series with the first portion of the load;
a second switch having a first terminal coupled to the supply voltage and a second terminal coupled to a reference potential; and
a slew rate control circuit responsive to a command input signal and to a feedback voltage across the first switch and the second switch, the slew rate control circuit configured to generate a first switch control signal with a first controllable slew rate for coupling to a control terminal of the first switch and to generate a second switch control signal with a second controllable slew rate for coupling to a control terminal of the second switch, wherein the command input signal comprises a load configuration command to control the first switch and a converter mode command to control the second switch.

16. The LED driver of claim 15 wherein the converter is configured to operate in a Boost mode or in a Buck-Boost mode based on the converter mode command such that the second switch is closed in the Boost mode and the second switch is opened in the Buck-Boost mode.

17. The LED driver of claim 15 wherein the LED load comprises a headlamp and the load configuration command includes a first state that corresponds to a high beam configuration in which the first switch is off so that the first portion of the load is on and the second portion of the load is on, and a second state corresponding to a low beam configuration in which the first switch is on so that the first portion of the load is off and the second portion of the load is on.

18. The LED driver of claim 15 wherein the slew rate control circuit is further configured to detect a rate of change of the feedback voltage and wherein the controllable slew rate of the first switch control signal and the second switch control signal are based on the detected rate of change of the feedback voltage.

19. A driver coupled to a configurable load, the load powered by a load voltage generated by a converter powered by a supply voltage, the driver comprising:
  a switch means for configuring the load and a mode of operation of the converter, the switch means including a first switch means having a first terminal coupled to an intermediate node of the load and a second terminal coupled to the supply voltage, wherein the intermediate node is disposed between a first portion of the load and a second portion of the load coupled in series with the first portion of the load, wherein the first switch means is coupled in parallel with the second portion of the load; and
  a control means responsive to a command input signal and to a feedback voltage across the switch means for generating a control signal for the switch means.

20. The driver of claim 19 wherein the switch means further comprises:
  a second switch means having a first terminal coupled to the supply voltage and a second terminal coupled to a reference potential.

21. The driver of claim 19 wherein the command input signal comprises a first command input signal portion that controls a configuration of the load and a second command input signal portion that controls the mode of operation of the converter.

22. The driver of claim 1, wherein the first portion comprises a first plurality of LEDs corresponding to a high beam configuration, and the second portion comprises a second plurality of LEDs corresponding to a low beam configuration.

* * * * *

UNITED STATES PATENT AND TRADEMARK OFFICE
CERTIFICATE OF CORRECTION

PATENT NO. : 10,412,797 B2
APPLICATION NO. : 15/722238
DATED : September 10, 2019
INVENTOR(S) : Nai-Chi Lee It is certified that error appears in the above-identified patent and that said Letters Patent is hereby corrected as shown below:

On the Title Page

Item (71) Applicant: delete "Worcester, MA (US)" and replace with --Manchester, NH (US)--.

In the Specification

Column 6, Line 55 delete "be an user" and replace with --be a user--.

Column 6, Line 65 delete "the a second" and replace with --a second--.

Column 8, Line 38 delete "$I_{LED}$ 46" and replace with --$i_{LED}$ 46--.

Column 8, Line 66 delete "circuit 40" and replace with --circuit 50--.

Column 9, Line 22 delete "coupled a" and replace with --coupled to a--.

Column 11, Line 39 delete "140*a*".

Column 11, Line 40 delete "140*b*.".

Column 11, Line 45 delete "140*a*".

Column 11, Line 47 delete "140*b*.".

Column 12, Line 29 delete ", examples" and replace with --, example--.

Column 12, Line 57 delete ", examples" and replace with --, example--.

Column 12, Line 60 delete "at logic" and replace with --at a logic--.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*

Column 12, Line 66 delete "154 the driver" and replace with --154 and the driver--.

Column 15, Line 15 delete "B2 244 cause" and replace with --B2 244 can cause--.

Column 18, Line 11 delete "load (and" and replace with --load) and--.

In the Claims

Column 19, Line 44 delete "if the load" and replace with --of the load--.